(12) United States Patent
Murakami et al.

(10) Patent No.: US 8,897,163 B2
(45) Date of Patent: Nov. 25, 2014

(54) WIRELESS COMMUNICATION METHOD, BASE STATION, WIRELESS COMMUNICATION SYSTEM, AND COMMUNICATION APPARATUS

(75) Inventors: Tomoki Murakami, Yokosuka (JP); Riichi Kudo, Yokosuka (JP); Takeo Ichikawa, Yokosuka (JP); Yasushi Takatori, Yokosuka (JP); Munehiro Matsui, Yokosuka (JP); Yusuke Asai, Yokosuka (JP); Masato Mizoguchi, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 236 days.

(21) Appl. No.: 13/583,340
(22) PCT Filed: Mar. 10, 2011
(86) PCT No.: PCT/JP2011/055653
§ 371 (c)(1),
(2), (4) Date: Sep. 7, 2012
(87) PCT Pub. No.: WO2011/111779
PCT Pub. Date: Sep. 15, 2011

(65) Prior Publication Data
US 2013/0039205 A1 Feb. 14, 2013

(30) Foreign Application Priority Data

Mar. 11, 2010 (JP) .................. 2010-054633
Aug. 5, 2010 (JP) .................. 2010-176568

(51) Int. Cl.
*G01R 31/08* (2006.01)
*H04B 5/00* (2006.01)
(Continued)

(52) U.S. Cl.
CPC .............. *H04B 7/0452* (2013.01); *H04B 5/00* (2013.01); *H04W 72/082* (2013.01); *H04B*
(Continued)

(58) Field of Classification Search
CPC ......... H04W 52/24; H04B 15/00; H04B 7/00; H03D 1/04
See application file for complete search history.

(56) References Cited

U.S. PATENT DOCUMENTS

2008/0008229 A1* 1/2008 Hamabe et al. ............... 375/148
2009/0017759 A1 1/2009 Li et al.
(Continued)

FOREIGN PATENT DOCUMENTS

JP 2005-244330 A 9/2005
JP 2006-128812 A 5/2006
(Continued)

OTHER PUBLICATIONS

IEEE Std 802.11™-2012, IEEE Standard for Information technology—Telecommunications and information exchange between systems, Local and metropolitan area networks—Specific requirements, Part 11: Wireless LAN Medium Access Control (MAC) and Physical Layer (PHY) Specifications, IEEE, New York, NY, Mar. 29, 2012.
(Continued)

*Primary Examiner* — Anez Ebrahim
(74) *Attorney, Agent, or Firm* — Harness, Dickey & Pierce, P.L.C.

(57) ABSTRACT

Provided are a wireless communication method, a base station, a wireless communication system and a communication apparatus whereby an interference power is calculated from an estimated propagation channel estimation result and the transmission power is controlled based on the interference power or the interference is suppressed by controlling the directivity, thereby increasing the transmission capacity. A propagation channel estimation circuit performs propagation channel estimation from a response signal transmitted from a terminal station and estimates a propagation channel estimation result. An interference power calculation circuit measures each interference power from a signal of each sub-carrier received by each of wireless units, and calculates an interference power for each sub-carrier from the propagation channel estimation result estimated by the propagation channel estimation circuit. When the calculated interference power is equal to or more than a predetermined threshold, an interference suppression signal generation circuit changes the transmission power and generates an interference suppression signal.

12 Claims, 27 Drawing Sheets

| INTERFERENCE POWER [DB] | TRANSMISSION POWER [DB] |
|---|---|
| 0 | -20 |
| 5 | -15 |
| 10 | -10 |
| 20 | 0 |
| 30 | 10 |
| 40 | 20 |
| 50 | 30 |

(51) Int. Cl.
H04B 7/04    (2006.01)
H04W 72/08   (2009.01)
H04B 17/00   (2006.01)
H04W 52/24   (2009.01)
H04W 72/04   (2009.01)

(52) U.S. Cl.
CPC .. 17/005 (2013.01); *H04W 72/0453* (2013.01); *H04W 52/243* (2013.01)
USPC ........... 370/252; 370/338; 370/328; 370/310; 455/434; 455/422.1; 455/403

(56) References Cited

U.S. PATENT DOCUMENTS

| 2010/0103919 | A1* | 4/2010 | Murakami et al. | 370/344 |
| 2010/0118731 | A1* | 5/2010 | Koyanagi | 370/252 |
| 2010/0215075 | A1* | 8/2010 | Jonsson et al. | 375/130 |

FOREIGN PATENT DOCUMENTS

| JP | 2008-193306 A | 8/2008 |
| JP | 2009-159406 A | 7/2009 |
| JP | 2009-232041 A | 10/2009 |
| WO | WO-2009/009464 A1 | 1/2009 |

OTHER PUBLICATIONS

IEEE P802.11ac™/D3.0, Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz, Prepared by the 802.11 Working Group of the 802 Committee, IEEE, New York, NY, Jun. 2012.

IEEE 802.11n™, IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput, IEEE, New York, NY, Oct. 29, 2009.

Masahiro Morikura, Shuji Kubota, "3rd Revised Version 802.11 High-Speed Wireless LAN Textbook", Impress R&D, Mar. 27, 2008.

Q. H. Spencer, A. L. Swindlehurst, and M. Haardt, "Zero-forcing methods for downlink spatial multiplexing in multiuser MIMO channels", IEEE Trans. Sig. Processing, vol. 52, issue 2, Feb. 2004, pp. 461-471.

V. Chandrasekhar and J. G. Andrews, "Femtocell Networks: A Survey," IEEE Comm. Magazine, vol. 46, issue 9, pp. 59-67, Sep. 2008.

International Search Report (in Japanese with English translation) and Written Opinion (in Japanese) for PCT/JP2011/055653, mailed Jun. 7, 2011; ISA/JP.

First Office Action, Chinese Patent Application No. 201180012980.1, Jul. 1, 2014.

* cited by examiner

FIG. 3

| INTERFERENCE POWER [DB] | TRANSMISSION POWER [DB] |
|---|---|
| 0 | -20 |
| 5 | -15 |
| 10 | -10 |
| 20 | 0 |
| 30 | 10 |
| 40 | 20 |
| 50 | 30 |

FIG. 15

|  |  | t1 | t2 | t3 | t4 | t5 | t6 | t7 | t8 | t9 |
|---|---|---|---|---|---|---|---|---|---|---|
| TRANSMISSION STATION ADDRESS 1 | f1 | ○ | × | ○ | × | × | ○ | ○ | × | ○ |
|  | f2 | — | — | — | — | — | — | — | — | — |
|  | f3 | — | — | — | — | — | — | — | — | — |
|  | f4 | — | — | — | — | — | — | — | — | — |

|  |  | t10 | t11 | t12 | t13 | t14 | t15 | t16 | t17 | t18 |
|---|---|---|---|---|---|---|---|---|---|---|
| TRANSMISSION STATION ADDRESS 2 | f1 | ○ | × | ○ | ○ | × | ○ | ○ | × | ○ |
|  | f2 | ○ | × | ○ | ○ | × | ○ | ○ | × | ○ |
|  | f3 | — | — | — | — | — | — | — | — | — |
|  | f4 | — | — | — | — | — | — | — | — | — |

|  |  | t19 | t20 | t21 | t22 | t23 | t24 | t25 | t26 | t27 |
|---|---|---|---|---|---|---|---|---|---|---|
| TRANSMISSION STATION ADDRESS 3 | f1 | — | — | — | — | — | — | — | — | — |
|  | f2 | — | — | — | — | — | — | — | — | — |
|  | f3 | ○ | ○ | ○ | ○ | ○ | ○ | ○ | × | ○ |
|  | f4 | ○ | ○ | ○ | ○ | ○ | ○ | ○ | × | ○ |

# WIRELESS COMMUNICATION METHOD, BASE STATION, WIRELESS COMMUNICATION SYSTEM, AND COMMUNICATION APPARATUS

TECHNICAL FIELD

The present invention relates to a wireless communication method, a base station, a wireless communication system, and a communication apparatus in which, when communication cells that perform wireless packet communication through autonomous distributed control are adjacent, an interference power directed to the adjacent communication cell is suppressed using transmission power control or directivity control and simultaneously, transmission with a communication party terminal station is performed.

Further, the present invention relates to a wireless communication method, a base station, a wireless communication system, and a communication apparatus in which wireless communication is performed using a plurality of frequency channels.

This application is a 371 U.S. National Stage of International Application No. PCT/JP2011/055653, filed on Mar. 10, 2011. This application claims priorities to and the benefits of Japanese Patent Application No. 2010-054633 filed on Mar. 11, 2010 and Japanese Patent Application No. 2010-176568 filed on Aug. 5, 2010, the contents of which are hereby incorporated by reference.

BACKGROUND ART

As a high-speed wireless access system using a 5 GHz band, there is the IEEE802.11a standard. In this system, a transmission rate of a maximum of 54 Mbps has been realized using an orthogonal frequency division multiplexing (OFDM) modulation scheme that is technology for stabilizing a characteristic in a multipath fading environment. However, here, the transmission rate is a transmission rate on a physical layer. In fact, since transmission efficiency in a MAC (Medium Access Control) layer is about 50 to 70%, an upper limit value of actual throughput is about 30 Mbps (e.g., see Non-Patent Document 1).

Further, IEEE802.11n is aimed at realizing high-speed communication by using MIMO (Multiple input multiple output) technology capable of realizing spatial multiplexing in the same frequency channel and time using a plurality of antennas, technology using 40 MHz from two current 20 MHz frequency channels, or technology such as frame aggregation in which a plurality of frames are aggregated and then transmitted or improving efficiency through reduction of overhead of a control signal using a block ACK signal, and is capable of realizing a transmission rate of a maximum of 600 Mbps.

Further, IEEE802.11ac that is currently being developed is aimed at realizing faster wireless communication than IEEE802.11n by using communication technology using 80 MHz from simultaneous use of four 20 MHz frequency channels or MU-MIMO (Multi-User MIMO) technology in which communication with a plurality of wireless stations is performed in the same frequency channel at the same time (e.g., see Non-Patent Document 2).

In recent years, as the demand for large capacity wireless communication has rapidly increased, base stations of wireless LANs have been installed at several places such as homes or stations. However, in an environment in which communication cells (each including one base station and a plurality of terminal stations) using the same frequency channel are adjacent, signals interfere with each other, and excellent wireless communication cannot be performed (in general, in a wireless communication system such as a mobile phone or a wireless LAN, one wireless base station, or a communication cell including a base station and a plurality of terminal stations is regarded as a minimum unit of a wireless network).

In order to resolve such a problem, in wireless communication in a current wireless LAN, a different frequency channel or a different time is allocated to each communication cell to avoid interference and then wireless communication is performed. However, even when adjacent communication cells increase, since radio resources (frequency channel or time) allocated to each communication cell are finite, sufficient radio resources are not allocated to each communication cell and a transmission rate is degraded. Further, as standardization progresses in order of IEEE802.11a, IEEE802.11n, and IEEE802.11ac, when a 20 MHz OFDM block is used as one frequency channel, the number of frequency channels that can be simultaneously used is reduced to 4, 2, and 1, and thus, frequency channels that can be allocated are reduced. Accordingly, adjacent communication cells that perform communication using the same frequency channel increase.

Further, in the Radio Act, since the number of frequency channels that can be used in the wireless LAN is limited, when there are many adjacent communication cells, communication is performed using the same frequency channel as an adjacent channel. In this environment, a throughput is degraded due to interference from an adjacent communication cell. In order to avoid this interference, frequency channel allocation technology is used in which a frequency channel used by the adjacent communication cell is sensed and wireless communication is performed using an unused frequency channel. Further, when a communication frame is not received due to the interference from the adjacent communication cell, the same communication frame is transmitted again. Data transmission is performed through retransmission until the communication frame is received.

In order to resolve this problem, technology for increasing a transmission rate of each communication cell by allowing respective communication cells to simultaneously perform communication even when the communication cells are adjacent by suppressing an interference power directed to an adjacent communication cell in advance through control of a transmission power has been considered (e.g., see Non-Patent Document 3).

Further, in order to increase a transmission rate of each communication cell, interference suppression using MIMO technology in which interference suppression is performed by controlling directivity of a transmitted radio wave using propagation channels between a plurality of antennas for transmission and reception giving interference has been considered.

PRIOR ART DOCUMENTS

Non-Patent Documents

Non-Patent Document 1: Masahiro Morikura, Shuji Kubota, "3rd Revised Version 802.11 High-Speed Wireless LAN Textbook", Impress R&D, Mar. 27, 2008.
Non-Patent Document 2: Q. H. Spencer, A. L. Swindlehurst, and M. Haardt, "Zero-Forcing Methods for Downlink Spatial Multiplexing in Multiuser MIMO Channels," IEEE Trans. Sig. Processing, vol. 52, issue 2, February 2004, pp. 461-471.

Non-Patent Document 3: V. Chandrasekhar and J. Andrews, "Femtocell Networks: A Survey," IEEE Comm. Magazine, vol. 46, issue 9, pp. 59-67, September 2008.

DISCLOSURE OF INVENTION

Problems to be Solved by the Invention

As a demand for wireless communication increases, base stations are being installed at several places such as home or stations. In many cases, a plurality of base stations are installed at adjacent places.

For example, in a wireless LAN, interference between communication cells is avoided by allocating different frequency channels or different times to the respective communication cells, and wireless communication is performed. In the frequency channel, when there are IEEE802.11a/n/ac wireless units, the wireless units operate using any of 20 MHz, 40 MHz, and 80 MHz frequency channels, respectively. Further, in the time, communication is performed at different times by performing transmission using CSMA/CA (Carrier Sense Multiple Access/Collision Avoidance) to thereby avoid the interference.

However, when communication cells established by adjacent base stations are densely arranged, since allocated radio resources (the time or the frequency channel) are finite, radio resources allocated to the respective communication cells are limited and a transmission rate is degraded. For example, when there are a plurality (n) of adjacent communication cells, the transmission rate is degraded to 1/n of a transmission rate when there is no adjacent communication cell.

Further, a wireless LAN has a problem in that it is difficult to optimally allocate a frequency channel or a time and the communication cell cannot perform to its true potential since each communication cell performs communication through autonomous distributed control. In order to resolve this problem, optimal allocation of the time or the frequency channel through cooperation between communication cells is considered, but it is difficult to actually introduce such allocation since a communication means between communication cells is not defined in the wireless LAN. Further, when many communication cells are adjacent, the optimization provides fewer effects since original radio resources (the time and the frequency channels) are fewer.

Further, technology for suppressing interference through directivity control using MIMO technology is considered, but accuracy of a channel estimation result increases adjacent cell interference. When the estimation accuracy is low, an interference suppression effect is reduced and the interference increases.

Further, in current retransmission, all of received communication frames are checked, and when there is an error, retransmission of all the communication frames is performed. When communication is performed using a plurality of frequency channels, data of all the frequency channels is checked in a lump.

Further, a wireless unit that is a party with which the base station performs communication is considered to conform to various standards from previous standards to new standards. In the wireless LAN, for example, when there are IEEE802.11a/n/ac wireless units, the wireless units operate using any of frequency bands of 20 MHz, 40 MHz and 80 MHz, respectively.

In an environment in which there are adjacent communication cells using single (20 MHz) or a plurality of frequency channels, when their communication cell is operating at 80 MHz, only a part of the used frequency channel is likely to be erroneous due to interference of the adjacent communication cell.

In this case, in current communication, when an error is generated in a single frequency channel, all communication frames are retransmitted. Accordingly, since the retransmission is also performed for frequency channels that can be received with no error, it is very inefficient.

Further, in a time division wireless LAN that performs transmission using CSMA/CA (Carrier Sense Multiple Access/Collision Avoidance), the number of wireless units that can be simultaneously accessed when there are adjacent communication cells using the same frequency is one. Accordingly, as adjacent communication cells increase, it is difficult to perform desired communication, thus degrading throughput. For example, when the same number of wireless units as an own station are present in an adjacent communication cell, throughput when there are adjacent communication cells is degraded to 1/N (N is the number of the adjacent communication cells), as compared to the throughput when there is no adjacent communication cell.

The present invention has been made in view of the circumstances, and an object of the present invention is to provide a wireless communication method, a base station, a wireless communication system, and a communication apparatus capable of suppressing interference with an adjacent communication cell and increasing transmission capacity.

Another object of the present invention is to provide a wireless communication method, a base station, a wireless communication system, and a communication apparatus capable of improving frequency use efficiency by reducing retransmission caused by interference from an adjacent communication cell and improving throughput.

Means for Solving Problems

In order to solve the above problems, the present invention is a wireless communication method in which each communication cell includes a base station and a terminal station, and a base station of a first communication cell performs wireless communication using the same time and frequency channel as a base station or a terminal station of a second communication cell adjacent to the first communication cell, the method including: transmitting, from the base station of the first communication cell, a transmission request signal to request transmission from the base station of the second communication cell; waiting for, by the base station of the first communication cell, a response signal transmitted from the terminal station of the second communication cell to be received when receiving the transmission request signal; transmitting, by the terminal station of the second communication cell, a response signal when receiving the transmission request signal; receiving, by the base station of the first communication cell, the response signal transmitted from the terminal station of the second communication cell, and calculating an interference power between the base station of the first communication cell and the terminal station of the second communication cell from the response signal; and performing, by the base station of the first communication cell, data transmission to the terminal station of the first communication cell based on a transmission power determined from the interference power.

Further, in order to achieve the above object, the present invention is a wireless communication method in which each communication cell includes a base station and a terminal station, and a base station of a first communication cell performs wireless communication using the same time and frequency channel as a base station or a terminal station of a second communication cell adjacent to the first communication cell, the method including: when the base station of the second communication cell performs transmission to a plurality of terminal stations included in the second communication cell using the same time and frequency channel, transmitting, from the base station of the second communication cell, a transmission request signal to request transmission to the plurality of terminal stations of the second communication cell; waiting for, by the base station of the first communication cell, reception of a plurality of response signals transmitted from the plurality of terminal stations of the second communication cell when receiving the transmission request signal; transmitting, by the plurality of terminal stations of the second communication cell, orthogonal response signals in the same time or transmitting response signals in order when receiving the transmission request signal; receiving, by the base station of the first communication cell, the response signals transmitted from the plurality of terminal stations of the second communication cell, calculating interference powers between the base station of the first communication cell and the plurality of terminal stations of the second communication cell from the response signals, and storing the interference powers; and performing, by the base station of the first communication cell, data transmission to the terminal station of the first communication cell with a transmission power equal to or less than a transmission power determined from the interference power.

In the above method, when the base station of the first communication cell determines the transmission power from the calculated interference power, such a transmission power that the interference power given to the terminal station of the second communication cell is equal to or less than a predetermined interference power amount may be determined as the transmission power.

In the above method, when the base station of the first communication cell determines the transmission power from the calculated interference power, such a transmission power that a transmission rate between the base station and the terminal station of the second communication cell is equal to or less than predetermined bits may be determined as the transmission power.

The above method may further include: when the base station of the first communication cell performs data transmission to the terminal station of the first communication cell using the transmission power determined from the interference power, estimating, by the base station of the first communication cell, a channel from the response signal transmitted from the terminal station of the second communication cell, and storing a propagation channel estimation result; and controlling, by the base station of the first communication cell, directivity of a radio wave produced from a plurality of antennas using the propagation channel estimation result, to thereby suppress an interference power directed to the terminal station of the second communication cell.

In the above method, when the base station of the first communication cell suppresses the interference power directed to the terminal station of the second communication cell using the antenna directivity control, the transmission power of the base station of the first communication cell may be determined based on an interference power caused by an error of the propagation channel estimation result.

The above method may further include: when the base station of the first communication cell performs data transmission to the terminal station of the first communication cell using the transmission power determined from the interference power, estimating, by the base station of the first communication cell, a propagation channel between the base station of the first communication cell and the terminal station of the first communication cell to acquire a propagation channel estimation result before a transmission request signal is transmitted from the base station of the second communication cell; calculating, by the base station of the first communication cell, the transmission rate in the first communication cell based on the propagation channel estimation result in the first communication cell, the propagation channel estimation result in the second communication cell, and the transmission power determined from the interference power; and determining, by the base station of the first communication cell, that the transmission is performed when the calculated transmission rate is equal to or more than a predetermined threshold.

The above method may further include: when the base station of the first communication cell performs data transmission to the terminal station of the first communication cell using the transmission power determined from the interference power, determining, by the base station of the first communication cell, the number of transmission streams and the transmission power based on the propagation channel estimation result in the first communication cell and the propagation channel estimation result in the second communication cell.

The above method may further include: when the base station of the first communication cell performs data transmission to the terminal station of the first communication cell using the transmission power determined from the interference power, estimating, by the base station of the first communication cell, a communication time of the second communication cell from the transmission request signal transmitted from the base station of the second communication cell; and performing, by the base station of the first communication cell, the transmission to the terminal station of the first communication cell before a communication time of the second communication cell.

Further, in order to achieve the above object, the present invention is a wireless communication method in which wireless communication is performed between wireless apparatuses using a plurality of frequency channels in an environment in which there are adjacent communication cells, the method including: calculating, by a wireless apparatus of a reception station, an interference frequency of each frequency channel from a received signal; and determining transmission parameters containing at least one of a modulation scheme, a coding rate for error correction coding, and a frequency channel for a wireless apparatus of a transmission station based on the interference frequency.

The above method may further include: dividing, by the wireless apparatus of the transmission station, a transmission signal for each frequency channels, as well as in a time direction.

The above method may further include: generating and transmitting, by the wireless apparatus of the reception station, an extended block ACK signal containing presence or absence of an error in each block divided in the frequency channel and the time direction; receiving, by the wireless apparatus of the transmission station, the extended block ACK signal transmitted from the wireless apparatus of the reception station; storing error information of each block detected from the received extended block ACK signal; calculating an interference frequency in each frequency channel from the stored error information of each block; and determining a transmission parameter for the wireless apparatus of the reception station based on the calculated interference frequency.

The above method may further include: receiving, by the wireless apparatus of the transmission station, the extended block ACK signals transmitted from wireless apparatuses of a plurality of reception stations; storing the error information of each block detected from the extended block ACK signal in each of the wireless apparatuses of the plurality of reception stations; calculating an interference frequency in each frequency channel from the error information of each block stored in each of the wireless apparatuses of the plurality of reception stations; and determining a transmission parameter for each of the wireless apparatuses of the plurality of reception stations based on the calculated interference frequency for each of the wireless apparatuses of the plurality of reception stations.

In the above method, the transmission parameter may be a division size of a transmission signal for each of the wireless apparatuses of the plurality of reception stations based on the calculated interference frequency.

In the above method, the extended block ACK signal may be transmitted using any one of a previously designated frequency channel, the same received frequency channel, a frequency channel having less error based on an interference frequency of each frequency channel, and a frequency channel having less error based on a history or statistics information of the interference frequency.

In the above method, the transmission parameter for each of the wireless apparatuses of the plurality of reception stations may be determined based on a history or statistics information of the interference frequency instead of the calculated interference frequency.

Further, in order to achieve the above object, according to the present invention, in a wireless communication system in which each communication cell includes a base station and a terminal station, and a base station or a terminal station of a first communication cell performs wireless communication using the same time and frequency channel as a base station or a terminal station of a second communication cell adjacent to the first communication cell, the base station of the first communication cell including: a plurality of antenna elements; a reception unit configured to receive a signal using the plurality of antenna elements; a transmission unit configured to transmit a signal using the plurality of antenna elements; a propagation channel estimation circuit configured to perform propagation channel estimation from a response signal transmitted from the terminal station of the second communication cell to obtain a propagation channel estimation result, the response signal being received by the reception unit; an interference power calculation circuit configured to calculate an interference power between the base station and the terminal station of the second communication cell from the propagation channel estimation result obtained by the propagation channel estimation circuit; and an interference suppression signal generation circuit configured to generate an interference suppression signal using a transmission power determined from the interference power calculated by the interference power calculation circuit when the interference power is equal to or more than a predetermined threshold, wherein the transmission unit performs data transmission to the terminal station of the first communication cell using the interference suppression signal generated by the interference suppression signal generation circuit.

The base station may further include: a transmission weight calculation circuit configured to calculate a transmission weight for suppressing an interference power directed to the terminal station of the first communication cell through antenna directivity control using the propagation channel estimation result obtained by the propagation channel estimation circuit, wherein the interference power calculation circuit may calculate an interference power when the transmission weight calculated by the transmission weight calculation circuit is used, and the interference suppression signal generation circuit may generate the interference suppression signal using the transmission weight calculated by the transmission weight calculation circuit and the interference power calculated by the interference power calculation circuit.

The base station may further include: a transmission determination circuit configured to estimate a transmission capacity of the first communication cell based on the propagation channel between the base station and the terminal station of the first communication cell estimated by the propagation channel estimation circuit and the interference suppression signal generated by the interference suppression signal generation circuit, and determine that the transmission is performed when the estimated transmission capacity is equal to or more than a predetermined threshold.

Further, in order to achieve the above object, the present invention is a wireless communication system in which wireless communication is performed between wireless apparatuses using a plurality of frequency channels in an environment in which there are adjacent communication cells, wherein: a wireless apparatus of a transmission station transmits a transmission signal using the plurality of frequency channels, and a wireless apparatus of a reception station receives the transmission signal from the wireless apparatus of the transmission station, calculates an interference frequency of each frequency channel from the received signal, and determines a transmission parameter containing at least one of a modulation scheme, a coding rate for error correction coding, and a frequency channel for the wireless apparatus of the transmission station based on the interference frequency.

Further, in order to achieve the above object, the present invention is a communication apparatus used when wireless communication is performed using a plurality of frequency channels, the apparatus including: a reception unit configured to receive a signal transmitted from a communication apparatus of a transmission station; an interference frequency calculation circuit configured to calculate an interference frequency of each frequency channel from the signal received by the reception unit; and a transmission-method determination circuit configured to determine a transmission parameter containing at least one of a modulation scheme, a coding rate for error correction coding, and a frequency channel for the communication apparatus of the transmission station based on the interference frequency calculated by the interference frequency calculation circuit.

Further, in order to achieve the above object, the present invention is a communication apparatus used when wireless communication is performed using a plurality of frequency channels, the apparatus including: a reception unit configured to receive a signal transmitted from a communication apparatus of a transmission station; a reception signal division circuit configured to divide the signal received by the reception unit into frequency channels; an interference frequency calculation circuit configured to calculate an interference frequency of each frequency channel divided by the reception signal division circuit; and a transmission-method determination circuit configured to determine a transmission parameter containing at least one of a modulation scheme, a coding rate for error correction coding, and a frequency channel for the communication apparatus of the transmission station based on the interference frequency.

Further, in order to achieve the above object, the present invention is a communication apparatus used when wireless communication is performed using a plurality of frequency channels, the apparatus including: an extended block ACK reception circuit configured to receive an extended block ACK signal containing a result of error check performed for each frequency channel, the extended block ACK signal being transmitted from a communication apparatus of a reception station; an extended block ACK analysis circuit configured to acquire information indicating presence or absence of an error in each block from the extended block ACK signal received by the extended block ACK reception circuit; a storage circuit configured to store the information indicating presence or absence of an error in each block; an interference frequency calculation circuit configured to calculate an interference frequency from the information indicating presence or absence of an error in each block stored in the storage circuit; and a transmission-method determination circuit configured to determine a transmission parameter for the wireless apparatus of the reception station based on the interference frequency calculated by the interference frequency calculation circuit.

Further, in order to achieve the above object, the present invention is a communication apparatus used when wireless communication is performed using a plurality of frequency channels, the apparatus including: a reception signal demodulation circuit configured to demodulate a reception signal; a reception signal division circuit configured to divide the reception signal demodulated by the reception signal demodulation circuit into frequency channels; an error correction circuit configured to perform error correction on each frequency channel divided by the reception signal division circuit; an error check circuit configured to check presence or absence of an error in the reception signal for each frequency channel based on the error correction by the error correction circuit; and an extended block ACK generation circuit configured to generate an extended block ACK signal for notifying a communication apparatus of a transmission station of the presence or absence of an error in the reception signal for each frequency channel by the error check circuit.

Effects of the Invention

According to the present invention, the base station of the first communication cell can suppress an interference power directed to the second communication cell through directivity control and transmission power control, and can increase throughput by performing wireless transmission to the terminal station of the first communication cell.

Further, according to the present invention, it is possible to improve frequency use efficiency by reducing retransmission caused by interference from an adjacent communication cell and improving throughput.

BRIEF DESCRIPTION OF THE DRAWINGS

FIG. 3 is a table showing an example of a relationship between an interference power and a transmission power.

FIG. 15 is a conceptual diagram illustrating an example of information stored in a storage circuit 106 according to the eleventh embodiment.

EMBODIMENTS FOR CARRYING OUT THE INVENTION

Hereinafter, an embodiment of the present invention will be described with reference to the accompanying drawings.

Figure 1:
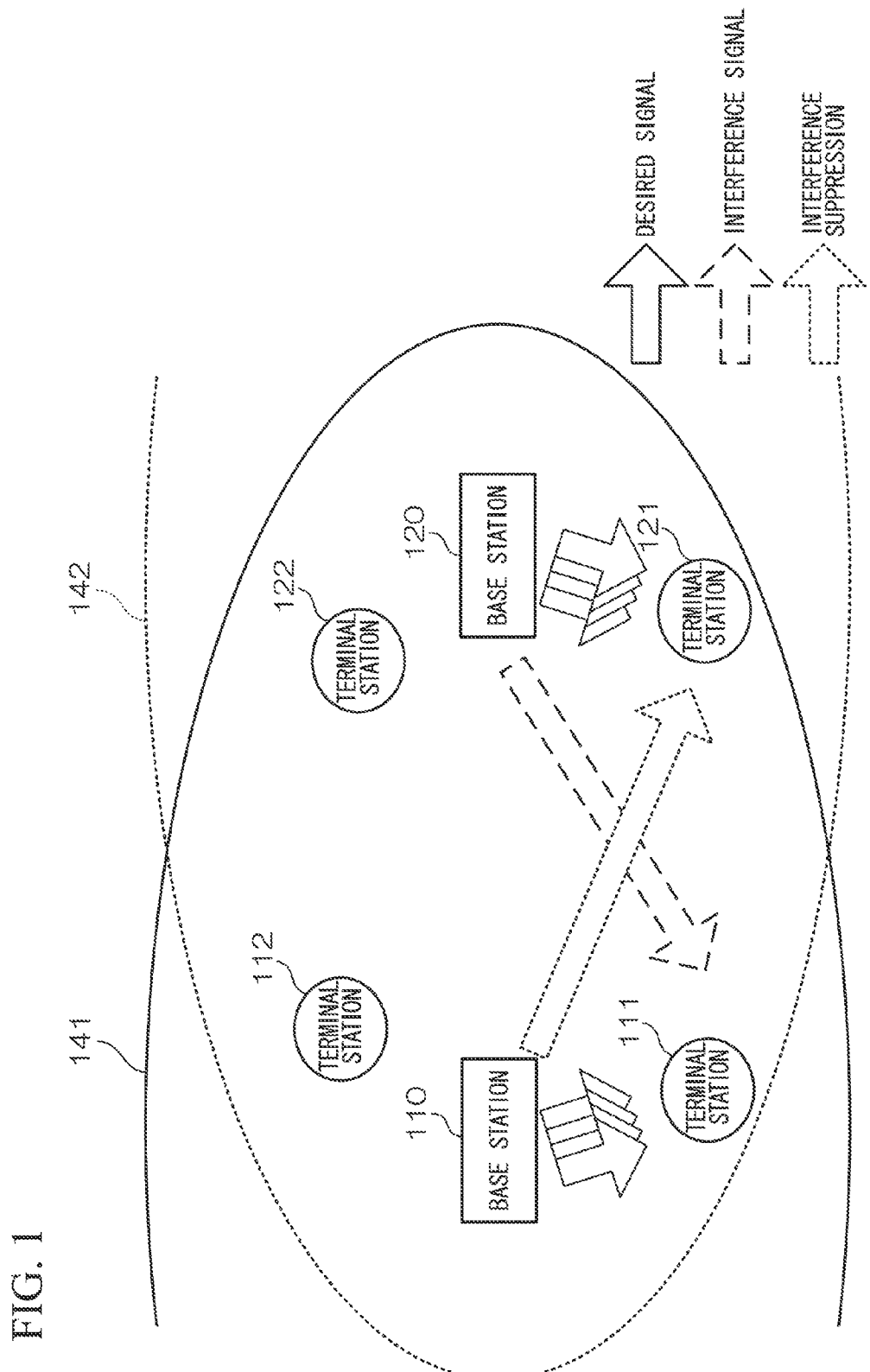
FIG. 1 is a conceptual diagram illustrating a wireless communication method in which a base station of a first communication cell according to the present invention suppresses interference with a terminal station of a second communication cell and simultaneously performs transmission to a terminal station of the first communication cell.

FIG. 1 is a conceptual diagram illustrating a wireless communication method in which a base station of a first communication cell according to the present invention suppresses interference with a terminal station of a second communication cell and simultaneously performs transmission to a terminal station of the first communication cell. In FIG. 1, the first communication cell 141 and the second communication cell 142 using the same frequency channel are adjacent. A base station 110, a terminal station 111, and a terminal station 112 belong to the communication cell 141. Further, a base station 120, a terminal station 121, and a terminal station 122 belong to the communication cell 142.

Further, in this example, it is assumed that, in the communication cell 141, transmission from the base station 110 to the terminal station 111 is performed, and simultaneously, the base station 120 suppresses interference with the terminal station 111 and performs transmission to the terminal station 121.

A. First Embodiment

Next, a first embodiment of the present invention will be described. The first embodiment is characterized in that interference power for the terminal station 121 of the second communication cell is suppressed through transmission power control of the base station 110 of the first communication cell, and simultaneously, communication with the terminal station 111 of the first communication cell is performed to thereby increase a transmission capacity of the first communication cell 141.

Figure 2:
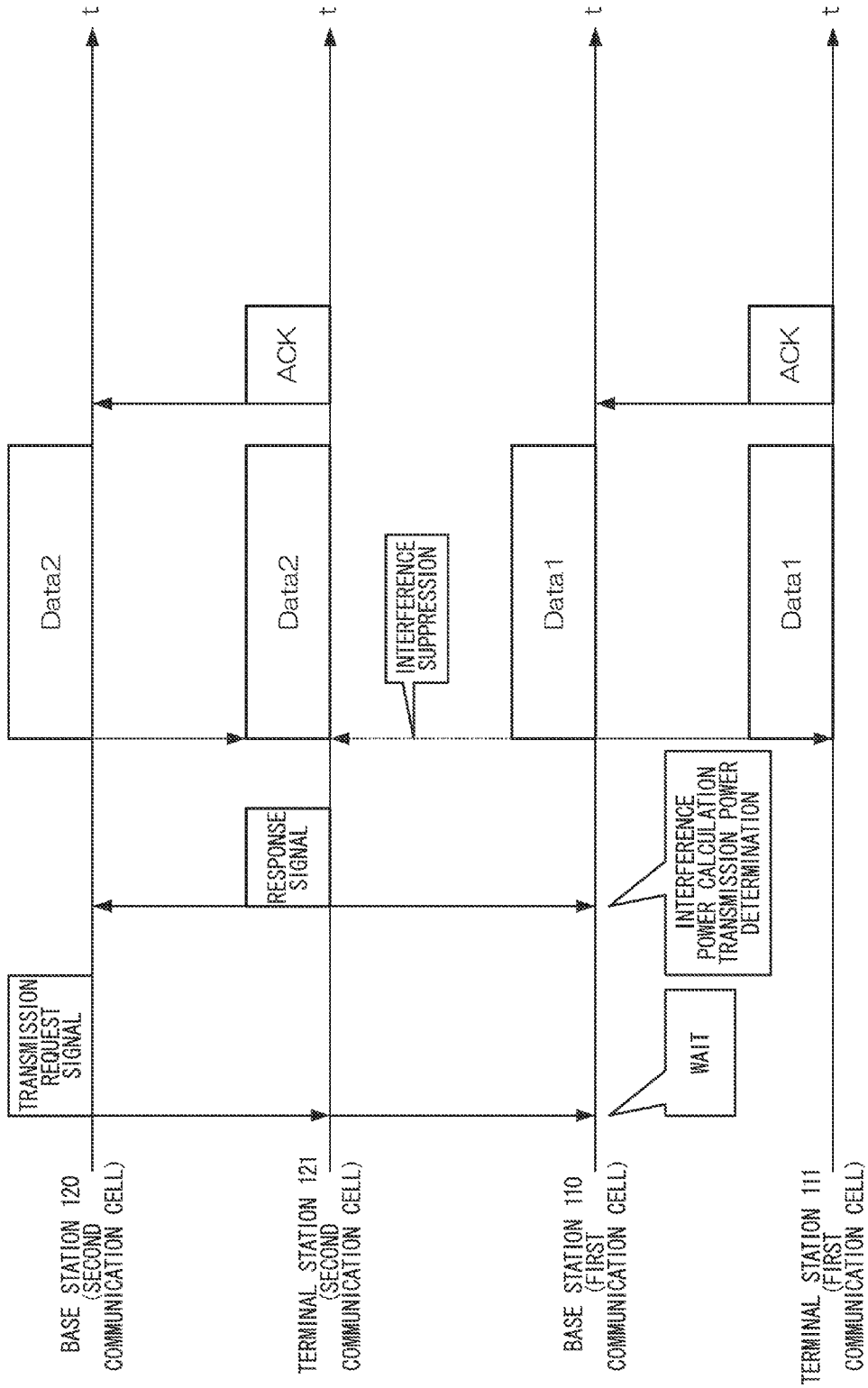
FIG. 2 is a sequence diagram illustrating a communication flow according to a first embodiment.

FIG. 2 is a sequence diagram illustrating a communication flow according to the first embodiment. In the first embodiment, the base station 120, the terminal station 121, the base station 110, and the terminal station 111 are included as shown in FIG. 1 and communication is performed according to the communication flow shown in FIG. 2.

In FIG. 2, first, the base station 120 transmits a transmission request signal to the terminal station 121.

The terminal station 121 receiving the transmission request signal transmits a response signal to the base station 120. The response signal may be a response signal used in a wireless LAN, and in addition, a signal may be transmitted in order to measure interference power. Meanwhile, when the base station 110 receives the transmission request signal of the base station 120, the base station 110 waits for the response signal transmitted from the terminal station 121 to be received, receives the response signal transmitted from the terminal station 121, and performs calculation of interference power from the received response signal. Next, when the interference power is equal to or more than a predetermined threshold, the base station 110 determines that a previously determined transmission power is to be used.

Next, the base station 120 receiving the response signal transmits data Data2 to the terminal station 121. Meanwhile, the base station 110 receiving the response signal transmits data Data1 to the terminal station 111 using the same time and frequency channel as those used in the transmission of the data Data2 and the determined transmission power. Finally, the terminal stations 121 and 111 transmit an ACK signal indicating that the communication has ended to their base stations (the base stations belonging to the same communication cells) 120 and 110.

Further, methods of calculating an interference power from the above response signal may include measuring reception powers of respective sub-carriers and using an average power as the interference power, and performing propagation channel estimation from the response signal and obtaining an interference power of each sub-carrier obtained from a propagation channel estimation result.

Further, when the transmission power is determined, the transmission power may be determined from a plurality of transmission power values for the interference power. FIG. 3 is a table showing an example of a relationship between an interference power and a transmission power. A transmission power "−20 (dB)" corresponds to an interference power "0 (dB)," a transmission power "−15 (dB)" corresponds to an interference power "5 (dB)," a transmission power "−10 (dB)" corresponds to an interference power "10 (dB)," ..., and a transmission power "30 (dB)" corresponds to an interference power "50 (dB)."

Further, the respective terminal stations 121 and 111 may simultaneously transmit the ACK signal using orthogonal codes, the terminal stations 121 and 111 may separately transmit the ACK signal through signal processing of the base station 120 and 110 instead of using the orthogonal codes, or the terminal stations 121 and 111 may transmit the ACK signal in order.

Figure 4:
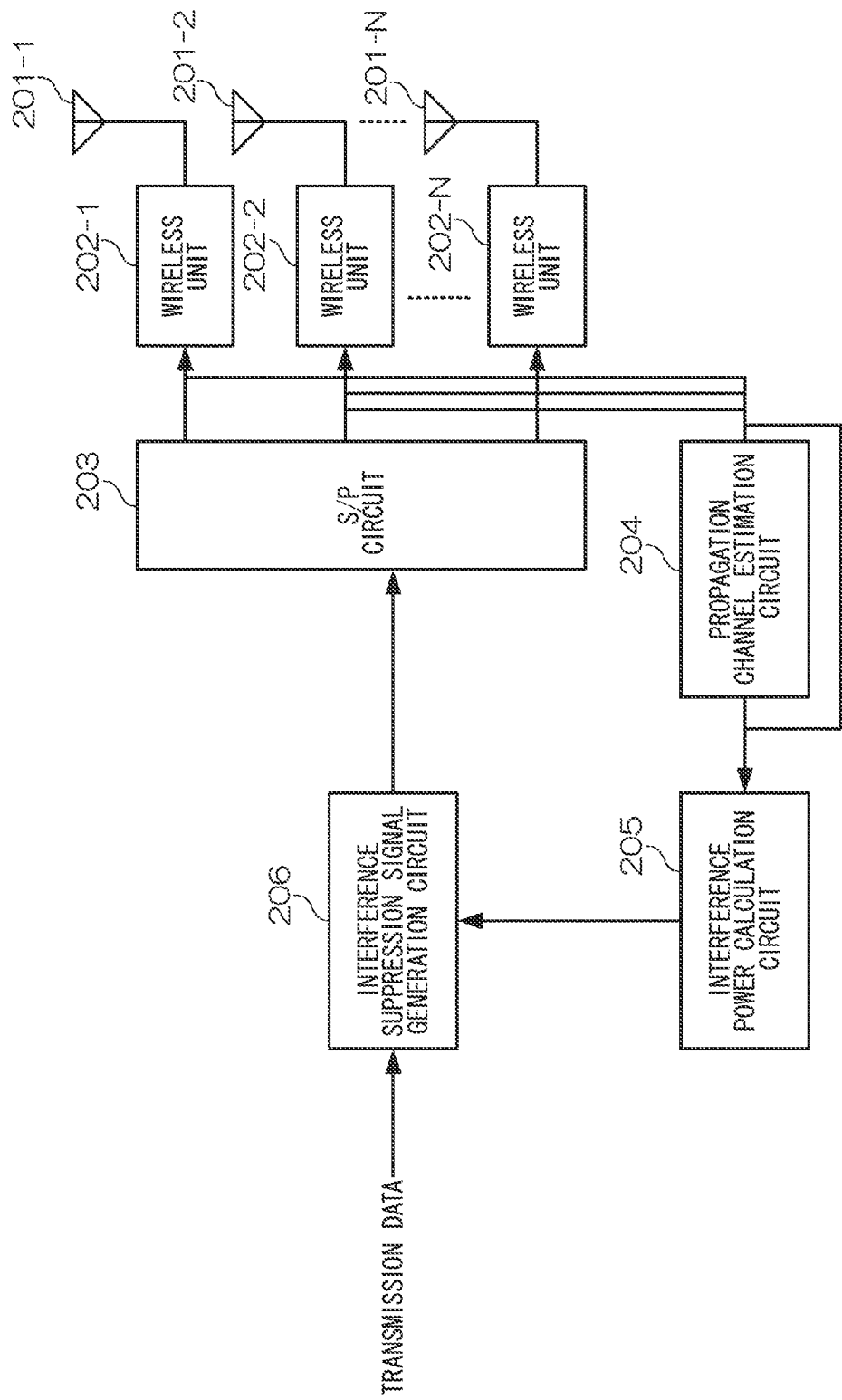
FIG. 4 is a block diagram illustrating an example of a configuration of a base station 110 of a first communication cell 141 according to the first embodiment.

FIG. 4 is a block diagram illustrating an example of a configuration of the base station 110 in the first communication cell 141 according to the first embodiment. In FIG. 4, the base station (the wireless apparatus) 110 includes antennas 201-1 to 201-N, wireless units 202-1 to 202-N, an S/P circuit 203, a propagation channel estimation circuit 204, an interference power calculation circuit 205, and an interference suppression signal generation circuit 206.

The antennas 201-1 to 201-N and the wireless units 202-1 to 202-N perform transmission and reception of a radio signal. The S/P circuit 203 divides a signal in order to transmit a transmission signal with the plurality of wireless units 202-1 to 202-N. The propagation channel estimation circuit 204 performs propagation channel estimation from the response signal transmitted from the terminal station 121 to obtain a propagation channel estimation result. The interference power calculation circuit 205 measures each interference power from a signal of each sub-carrier received by each of the wireless units 202-1 to 202-N, and calculates an interference power for each sub-carrier using the following Equation (1) from the propagation channel estimation result obtained by the propagation channel estimation circuit 204.

[Equation 1]

$$I = \|H\|_F^2 \quad (1)$$

In Equation (1), I denotes the calculated interference power, and H denotes an M×N propagation channel estimation result obtained by the propagation channel estimation circuit 204. M denotes the number of the antennas of the base station 110, and N denotes the number of the antennas of the terminal station 121. $\|A\|_F$ denotes a Frobenius norm of A. A total interference power is calculated from the interference power of each sub-carrier calculated as described above. When the calculated interference power is equal to or more than a predetermined threshold, the interference suppression signal generation circuit 206 generates an interference suppression signal using a predetermined transmission power.

However, a method of a transmission from the base station 110 may be a transmission method using MIMO technology or may be other transmission methods.

Thus, in the first embodiment, since the base station 110 can calculate the interference power by receiving the response signal from the terminal station 121, it is possible to perform transmission to the terminal station 111 while suppressing interference with the communication performed by the second communication cell 142.

B. Second Embodiment

Next, a second embodiment of the present invention will be described. The second embodiment is an example when the base station 120 of the second communication cell 142 performs transmission to the plurality of terminal stations 121 and 122 in the second communication cell 142. Accordingly, it is characterized in that a throughput of the first communication cell 141 increases even when the base station 120 of the second communication cell 142 performs transmission to the plurality of terminal stations 121 and 122.

Figure 5:
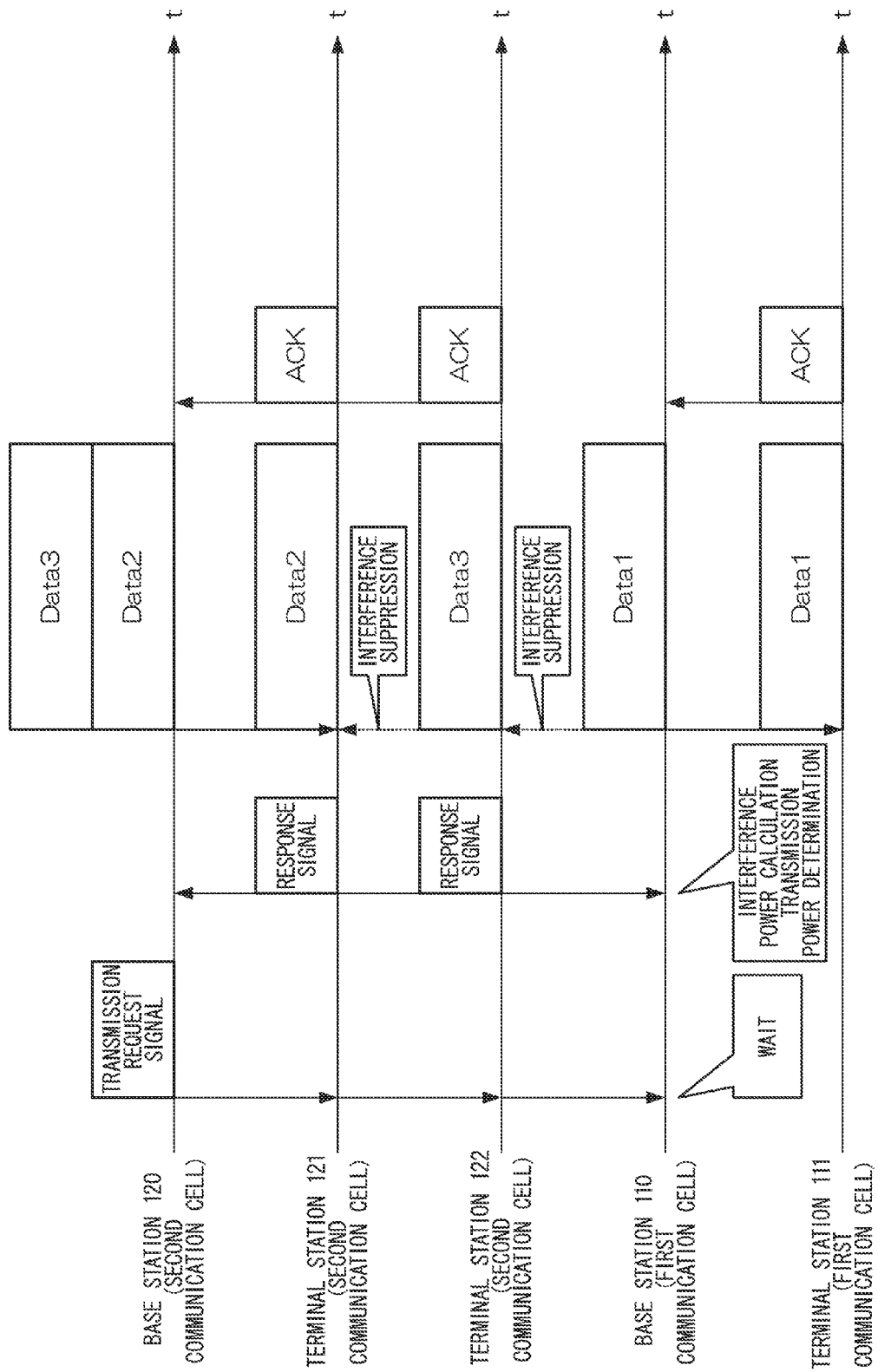
FIG. 5 is a sequence diagram illustrating a communication flow according to a second embodiment of the present invention.

FIG. 5 is a sequence diagram illustrating a communication flow according to the second embodiment. In the second embodiment, the base station 120, the terminal station 121, the terminal station 122, the base station 110, and the terminal station 111 are included as shown in FIG. 1, and communication is performed according to the communication flow shown in FIG. 5.

In FIG. 5, the base station 120 transmits a transmission request signal to the terminal station 121 and the terminal station 122. The terminal station 121 and the terminal station 122 receiving the transmission request signal transmit a response signal to the base station 120. Meanwhile, when the base station 110 receives the transmission request signal of the base station 120, the base station 110 waits for the response signals transmitted from the terminal station 121 and the terminal station 122. When the base station 110 receives the response signals transmitted from the terminal station 121 and the terminal station 122, the base station 110 calculates an interference power from the response signals and stores the interference power. Further, when the interference power is equal to or more than a predetermined threshold, the base station 110 determines that a predetermined transmission power is to be used.

Next, the base station 120 receiving the response signal transmits data Data2 and data Data3 to the terminal stations 121 and 122. Meanwhile, the base station 110 transmits data Data1 to the terminal station 111 using the same time and the same frequency channel as those used in the transmission of the data Data2 and the determined transmission power. Finally, the respective terminal stations 121, 122, and 111 transmit an ACK signal indicating that the communication has ended to their base stations (the base stations belonging to the same communication cell) 120 and 110, respectively.

Further, when the interference power is stored, only higher power may be stored.

Further, the respective terminal stations 121, 122 and 111 may simultaneously transmit the response signal and the ACK signal using orthogonal codes, the response signal and the ACK signal transmitted from the terminal stations 121, 122 and 111 may be separated through signal processing on the base station side instead of using the orthogonal codes, or the terminal stations 121, 122 and 111 may transmit the signals in order.

Further, while in the second embodiment, the transmission to the two terminal stations 121 and 122 has been performed, transmission to three or more terminal stations may be performed.

Thus, in the second embodiment, since the base station 110 can calculate the interference power by receiving the response signal from the terminal station 121 and the terminal station 122, the base station 110 can perform transmission to the terminal station 111 while suppressing interference due to the communication performed by the second communication cell 142.

C. Third Embodiment

Next, a third embodiment of the present invention will be described. The third embodiment is characterized in that an allowable interference power allowed to be given to the second communication cell 142 is set in advance, and the transmission power of the base station 120 is controlled to be equal to or less than the allowable interference power, thereby increasing a throughput of the first communication cell 141 above the first embodiment and the second embodiment.

In the third embodiment, the base station 120, the terminal station 121, the terminal station 122, the base station 110, and the terminal station 111 are included as shown in FIG. 1, and the communication is performed according to the communication flow shown in FIG. 2 or 5. However, the description of the third embodiment will be given with reference to FIG. 2. Further, the allowable interference power allowed to be given to the second communication cell 142 is detonated as $I_{max}$.

In the third embodiment, the base station 120, the terminal station 121, the terminal station 122, the base station 110, and the terminal station 111 are included as shown in FIG. 1, and communication is performed according to the communication flow shown in FIG. 2. In FIG. 2, first, the base station 120 transmits a transmission request signal to the terminal station 121. The terminal station 121 receiving the transmission request signal transmits a response signal to the base station 120. Meanwhile, when the base station 110 receives the transmission request signal of the base station 120, the base station 110 waits for receiving the response signal transmitted from the terminal station 121, receives the response signal transmitted from the terminal station 121, and calculates an interference power from the response signal and stores the interference power. The base station 110 determines a transmission power from the predetermined allowable interference power $I_{max}$ allowed to be given to the second communication cell 142, and the interference power.

Next, the base station 120 receiving the response signal transmits data Data2 to the terminal station 121. Meanwhile, the base station 110 receiving the response signal transmits data Data1 to the terminal station 111 using the same time and the same frequency channel as those used in the transmission of the data Data2 and the determined transmission power. Finally, the respective terminal stations 121 and 111 transmit an ACK signal indicating that the communication has ended to their base stations (the base stations belonging to the same communication cells) 120 and 110.

Further, an example of a configuration of the base station 110 in the first communication cell 141 according to the third embodiment will be described with reference to FIG. 4. A description of a mechanism described in the first embodiment is omitted and only added parts will be described. The interference suppression signal generation circuit 206 determines a transmission power according to the following Equation (2) using the interference power I calculated by the interference power calculation circuit 205 and the predetermined interference power $I_{max}$ allowed to be given to the second communication cell 142.

[Equation 2]

$$P' = I_{max}/I \qquad (2)$$

The power correction value P' that can be obtained using Equation (2) may be subtracted from a power P when the transmission power control of the base station 110 is not performed and then the transmission may be performed, and it is possible to perform so that the power does not exceed the allowable interference power $I_{max}$.

Further, when the base station 120 of the second communication cell 142 performs transmission to the plurality of terminal stations 121 and 122, a transmission power that does not exceed the allowable interference power $I_{max}$ for each of the terminal stations 121 and 122 may be calculated and a transmission signal may be generated using the lowest transmission power among the transmission powers or the transmission signal may be generated for an average power for the respective terminal stations 121 and 122 not to exceed the allowable interference power $I_{max}$.

Thus, in the third embodiment, since the base station 110 of the first communication cell 141 can perform the transmission power control so that the interference power equal to or more than the allowable interference power $I_{max}$ is not given to the terminal stations 121 and 122 in the second communication cell 142, the base station 110 can perform transmission to the terminal station 111 of the first communication cell 141 while suppressing interference with the communication performed by the second communication cell 142.

D. Fourth Embodiment

Next, a fourth embodiment of the present invention will be described. The fourth embodiment is characterized in that, when the transmission power of the base station 110 of the first communication cell 141 is determined, the transmission power is determined so that bit reduction due to the predetermined interference power given to the terminal stations 121 and 122 of the second communication cell 142 is equal to or less than a threshold.

The fourth embodiment may be provided with the same configuration and communication flow as in the third embodiment. However, the fourth embodiment differs from the third embodiment in that the transmission power calculation method in the interference suppression signal generation circuit 206 is determined using a reduction bit as an index. Hereinafter, the transmission power calculation method will be described.

A transmission capacity $C_2$ [bit/s/Hz] of the second communication cell 142 when the base station 110 of the first communication cell 141 does not perform transmission in the same time as communication of the base station 120 of the second communication cell 142 is given as the following Equation (3).

[Equation 3]

$$C_2 = \sum_{i=1}^{t} \log_2\left(1 + \frac{S_i}{N}\right) \qquad (3)$$

t denotes the number of streams transmitted by the base station 120, $S_i$ denotes a reception power of the $i^{th}$ transmission stream, and N denotes a noise power. Further, a transmission capacity $C_2'$ [bit/s/Hz] of the second communication cell 142 when the base station 110 of the first communication cell 141 performs transmission in the same time as communication of the base station 120 of the second communication cell 142 is given as the following Equation (4).

[Equation 4]

$$C_2' = \sum_{i=1}^{t} \log_2\left(1 + \frac{S_i}{N + I_{max}}\right) \qquad (4)$$

Next, an allowable reduction bit C of the second communication cell 142 is calculated according to the following Equations (5) and (6).

[Equation 5]

$$C = C_2 - C_2' = \sum_{i=1}^{t} \log_2\left(1 + \frac{S_i}{N}\right) - \sum_{i=1}^{t} \log_2\left(1 + \frac{S_i}{N + I_{max}}\right) \qquad (5)$$

[Equation 6]

$$\cong \sum_{i=1}^{t} \log_2\left(\frac{S_i}{N}\right) - \sum_{i=1}^{t} \log_2\left(1 + \frac{S_i}{N + I_{max}}\right) = t\log_2\left(\frac{N + I_{max}}{N}\right) \qquad (6)$$

The allowable reduction bit is calculated using Equation (6). According to Equation (6), since the reduction bit is represented by an equation that depends on $I_{max}$, the reduction bit can be controlled by changing $I_{max}$. That is, the transmission power can be calculated not to be equal to or less than the allowable reduction bit using the following Equations (7) and (8).

[Equation 7]

$$\frac{N + I_{max}}{N} = 2^{tC} \qquad (7)$$

[Equation 8]

$$P_1 = I_{max}/I \qquad (8)$$

Thus, in the fourth embodiment, since the base station 110 can control the transmission power for the second communication cell 142 not to be equal to or less than reduction bit C, the base station 110 can perform transmission to the terminal station 111 while suppressing interference of the communication performed by the second communication cell 142.

E. Fifth Embodiment

Next, a fifth embodiment of the present invention will be described. The fifth embodiment is characterized in that the interference power is suppressed by directivity control, as well as transmission power control of the interference power for the terminal station 121 of the second communication cell 142 from the base station 110 of the first communication cell 141.

Figure 6:
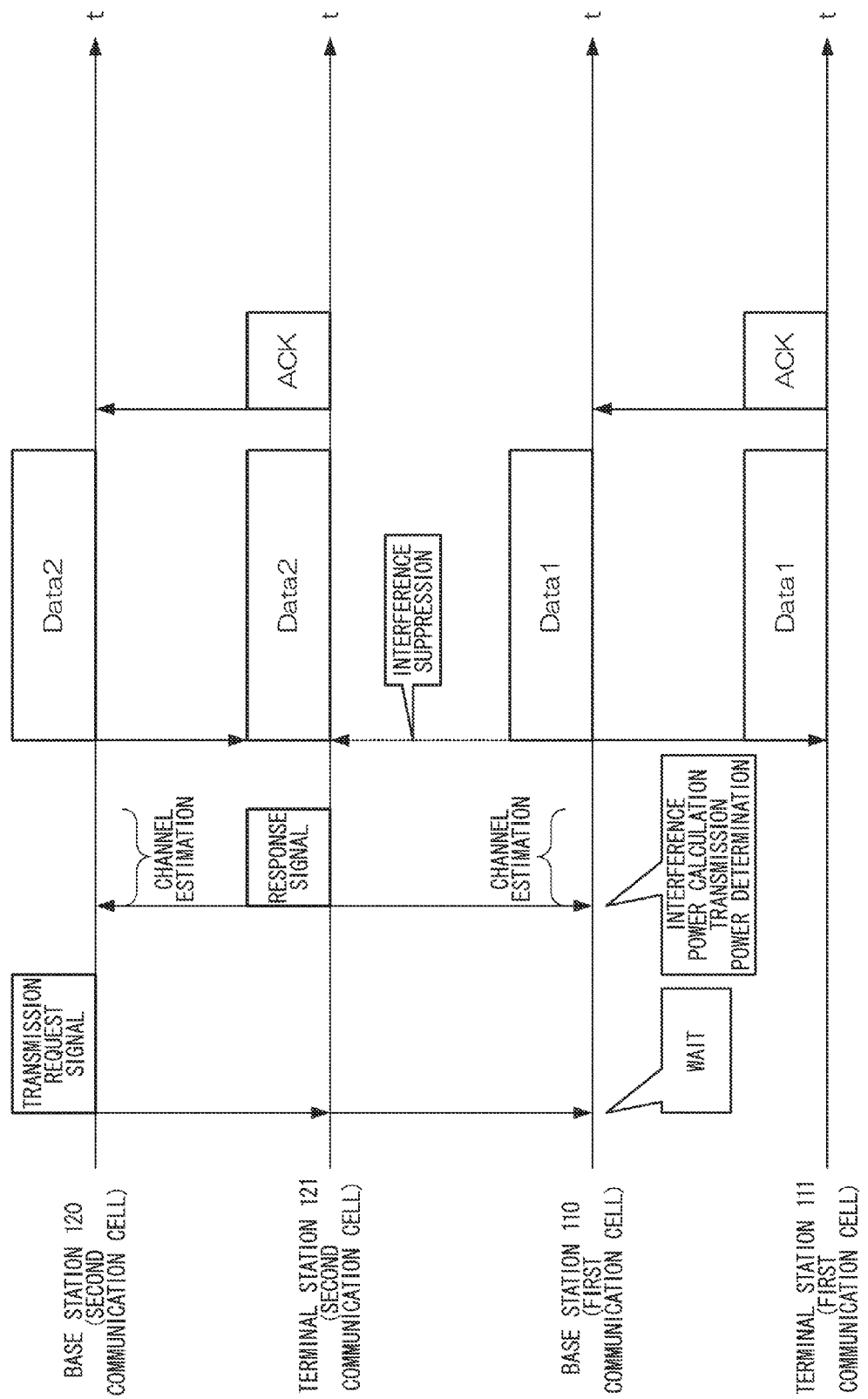
FIG. 6 is a sequence diagram illustrating a communication flow according to a fifth embodiment of the present invention.

FIG. 6 is a sequence diagram illustrating a communication flow according to the fifth embodiment. In the fifth embodiment, the base station 120, the terminal station 121, the base station 110, and the terminal station 111 are included as shown in FIG. 1, and communication is performed according to the communication flow shown in FIG. 6.

In FIG. 6, first, the base station 120 transmits a transmission request signal to the terminal station 121.

The terminal station 121 receiving the transmission request signal transmits a response signal to the base station 120. Meanwhile, when the base station 110 receives the transmission request signal of the base station 120, the base station 110 waits for receiving a response signal transmitted from the terminal station 121. When the base station 110 receives the response signal transmitted from the terminal station 121, the base station 110 performs propagation channel estimation from the response signal. The base station 110 calculates a transmission weight to suppress interference with the terminal station 121 using the propagation channel estimated through the propagation channel estimation. The base station 110 calculates an interference power amount when the transmission weight is used. When the interference power is equal to or more than a threshold, a determination of the transmission power is performed (the transmission power determination method may be any method described in the above-described embodiments).

Next, the base station 120 receiving the response signal transmits data Data2 to the terminal station 121. Meanwhile, the base station 110 receiving the response signal transmits data Data1 to the terminal station 111 using the same time and the same frequency channel as those used in the transmission of the data Data2 and the determined transmission power. Finally, the respective terminal stations 121 and 111 transmit an ACK signal indicating that the communication has ended to their base stations (the base stations belonging to the same communication cells) 120 and 110.

Figure 7:
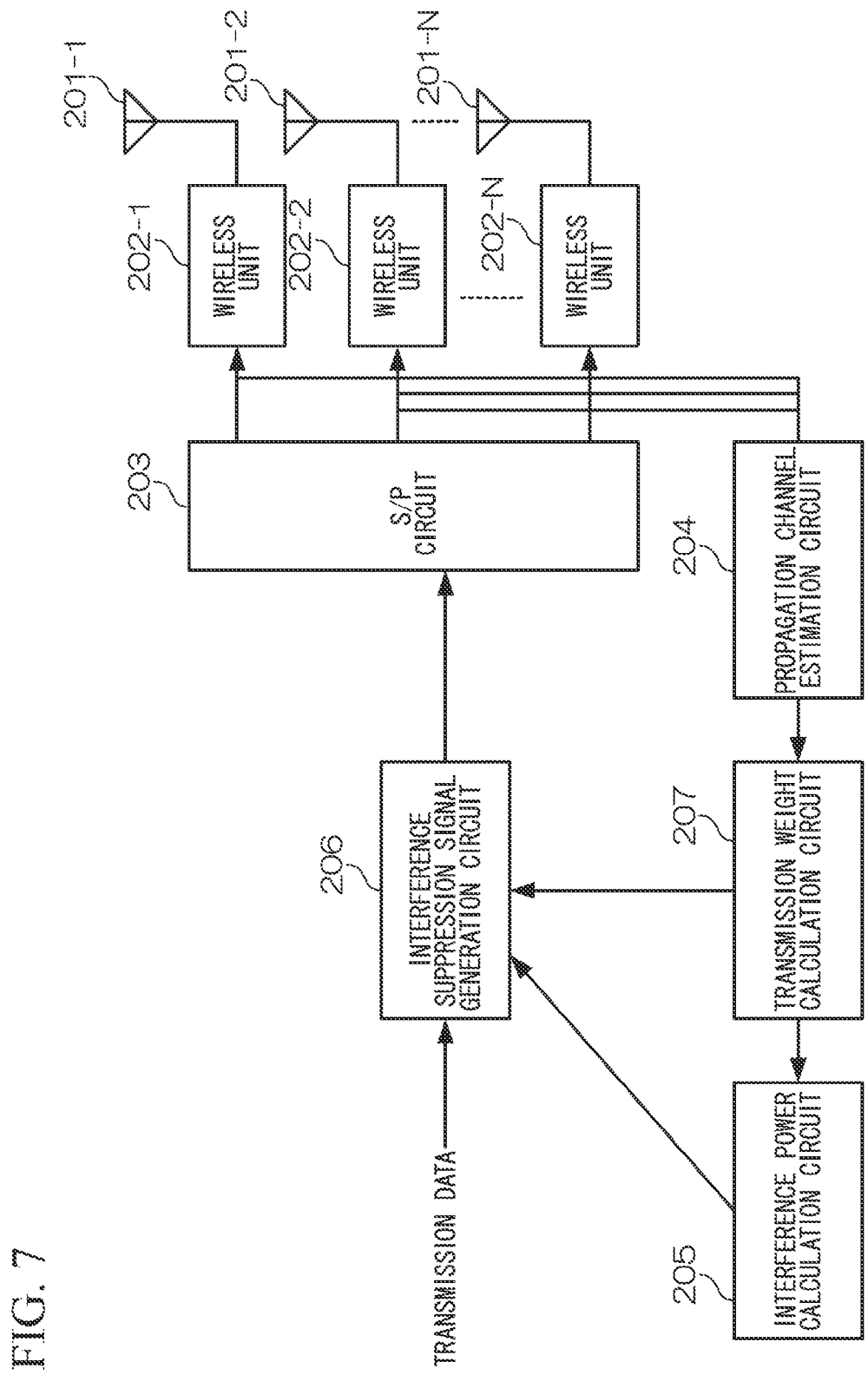
FIG. 7 is a block diagram illustrating an example of a configuration of a base station 110 of a first communication cell 141 according to a fifth embodiment of the present invention.

FIG. 7 is a block diagram illustrating an example of a configuration of the base station 110 of the first communication cell 141 according to the fifth embodiment. A description of the mechanism described above is omitted. In FIG. 7, a transmission weight calculation circuit 207 calculates, using a propagation channel H estimated by a propagation channel estimation circuit 204, a transmission weight to suppress interference power directed to the terminal station 121 by controlling antenna directivity. An interference power calculation circuit 205 performs calculation of the interference power when the transmission weight calculated by the transmission weight calculation circuit 207 is used. An interference suppression signal generation circuit 206 performs generation of a transmission signal using the transmission weight calculated by the transmission weight calculation circuit 207 and the interference power.

Further, the transmission weight calculation circuit 207 calculates the transmission weight V using the following Equation (9).

[Equation 9]

$$H = U(\Sigma 0)(V^{(s)} V^{(n)})  \quad (9)$$

Equation (9) is a result of singular value decomposition of the estimated propagation channel H. U denotes a left singular matrix, $\Sigma$ denotes a diagonalization matrix having an eigenvalue of the propagation channel H at diagonal terms, $V^{(S)}$ denotes a right singular matrix representing a signal space, and $V^{(n)}$ denotes a right singular matrix representing a null space. In Equation (9), $V^{(n)}$ denotes a transmission weight to suppress interference with the terminal station 121.

Further, when the calculated transmission weight is used and the interference power is obtained, an interference power is calculated using the following Equation (10).

[Equation 10]

$$I = \|HV^{(n)}\|_F^2 \quad (10)$$

When the interference power calculated using Equation (10) is equal to or more than a threshold, the interference with the terminal station 121 of the second communication cell 142 is suppressed by the transmission power control of the base station 110.

Thus, according to the fifth embodiment, since the base station 110 can perform interference suppression through the transmission power control as well as the directivity control for the second communication cell, the base station 110 can perform transmission to the terminal station 111 while suppressing interference with the communication performed by the second communication cell 142.

F. Sixth Embodiment

Next, a sixth embodiment of the present invention will be described. The sixth embodiment is characterized in that the transmission power is determined in consideration of a propagation channel estimation error and a time change in controlling the transmission power of the fifth embodiment, making it possible to suppress the interference power even when there is the propagation channel estimation error or the time change.

The sixth embodiment can be realized by the same configuration and communication flow as in the fifth embodiment. However, a different transmission power calculation method is used in the interference suppression signal generation circuit 206.

A propagation channel estimation result H' in which it is assumed that there are the channel estimation error and the time change is shown in Equation (11).

[Equation 11]

$$H' = H + E \quad (11)$$

E denotes white noise represented by an average 0 and a dispersion $\sigma^2$. In the sixth embodiment, a transmission weight V is determined according to Equation (9) using H'. Since the channel estimation result is different, a size of the interference power in Equation (10) becomes greater than H. In this state, the transmission power is determined. Further, a size of the dispersion $\sigma^2$ is a parameter set by a propagation environment.

Thus, according to the sixth embodiment, it is possible to suppress an interference power for the second communication cell 142 even when there is the propagation channel estimation error or the time change.

G. Seventh Embodiment

Next, a seventh embodiment of the present invention will be described. The seventh embodiment is characterized in that more efficient communication can be performed by performing transmission when the estimated transmission capacity of the first communication cell 141 exceeds a predetermined threshold.

Figure 8:
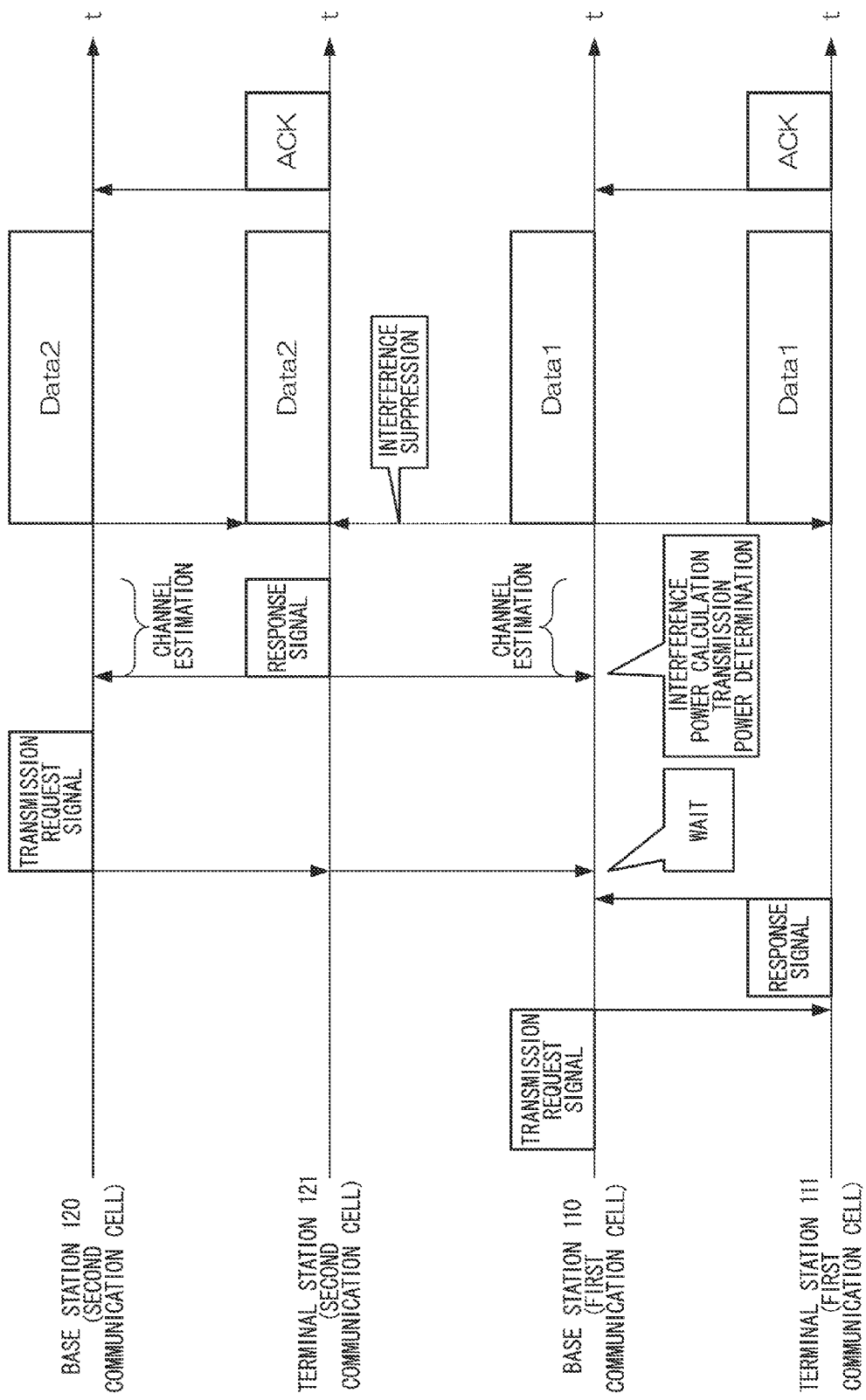
FIG. 8 is a sequence diagram illustrating a communication flow according to a seventh embodiment of the present invention.

FIG. 8 is a sequence diagram illustrating a communication flow according to the seventh embodiment. In the seventh embodiment, the base station 120, the terminal station 121, the base station 110, and the terminal station 111 are included as shown in FIG. 1, and communication is performed according to a communication flow shown in FIG. 8.

In FIG. 8, in order for the base station 110 to acquire a result of estimating a propagation channel between the base station 110 and the terminal station 111, the base station 110 transmits a transmission request signal to the terminal station 111, and the terminal station 111 receiving the transmission request signal transmits a response signal to the base station 110. Thus, the base station 110 acquires the propagation channel estimation result. The base station 110 performs estimation of a transmission capacity of the first communication cell 141 using Equation (12) based on the result of estimating the propagation channel between the base station 110 and the terminal station 111, and the transmission power. When the value of the estimated transmission capacity is equal to or more than a predetermined threshold, the transmission is determined as being performed.

[Equation 12]

$$C = \log_2 \det(I + HP_1 H^H) \quad (12)$$

Further, when the terminal station 111 transmits the response signal to the base station 110, the terminal station 111 may also transmit the interference power information from the base station 120. Further, when the transmission capacity of the first communication cell 141 is estimated, the transmission capacity may be estimated using the reception power between the base station 110 and the terminal station 111.

Figure 9:
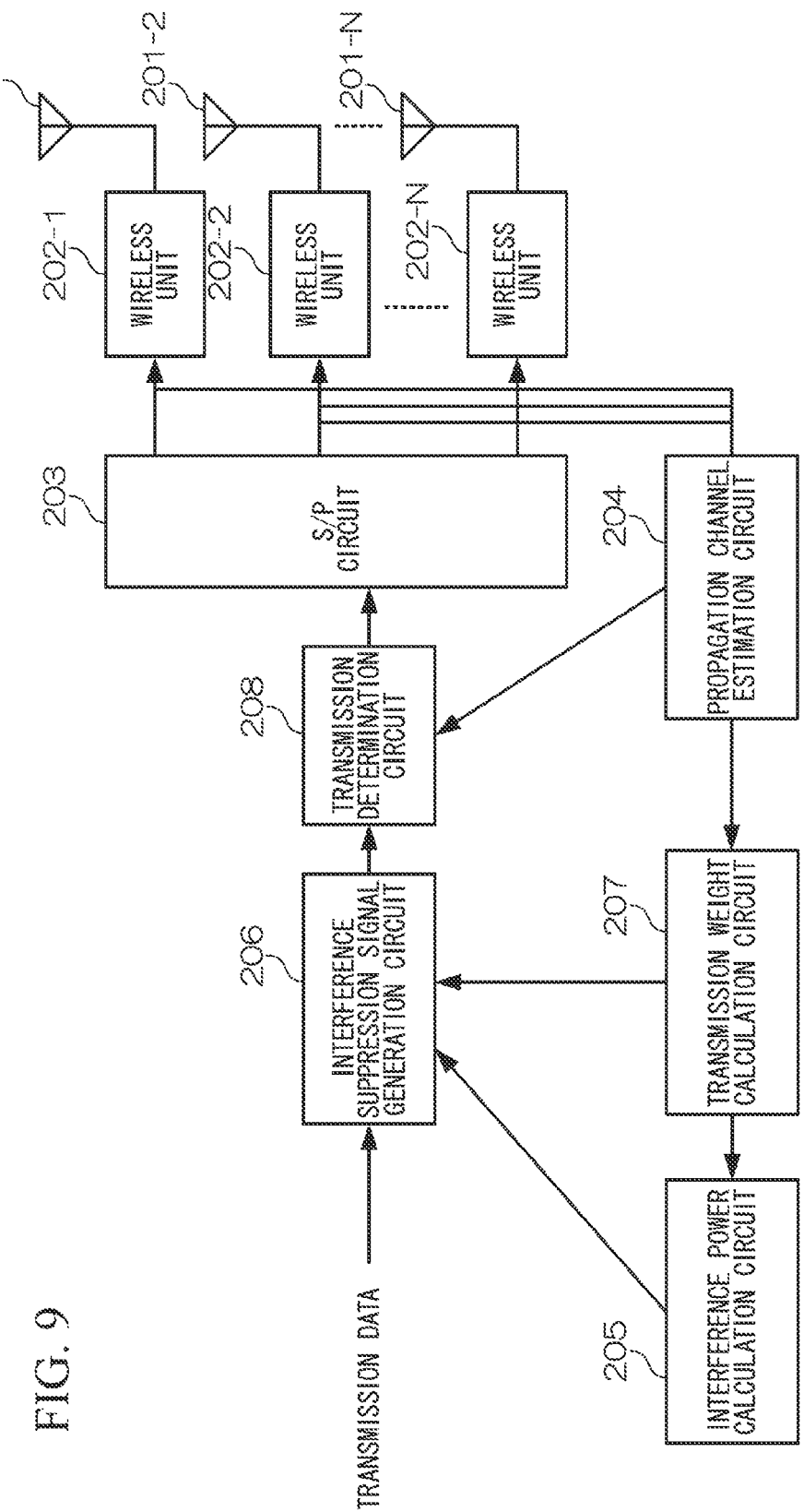
FIG. 9 is a block diagram illustrating an example of a configuration of a base station 110 of a first communication cell 141 according to the seventh embodiment of the present invention.

FIG. 9 is a block diagram illustrating an example of a configuration of the base station 110 of the first communication cell 141 according to the seventh embodiment of the present invention. The mechanism described above is omitted. In FIG. 9, a transmission determination circuit 208 estimates a transmission capacity increasing in the first communication cell 141 according to Equation (12) using a propagation channel H between the base station 110 and the terminal station 111 estimated by the propagation channel estimation circuit 204 and the transmission signal determined by the interference suppression signal generation circuit 206, and determines that the transmission is performed when the estimated transmission capacity is equal to or more than a predetermined threshold.

Thus, according to the seventh embodiment, it is possible to improve a success rate of the communication by estimating the transmission capacity of the first communication cell 141 and determining whether the transmission is possible.

H. Eighth Embodiment

Next, an eighth embodiment will be described. The eighth embodiment is characterized in that the communication capacity of the first communication cell 141 is increased by suppressing an interference power to be within an allowable interference power or an allowable reduction bit and considering only some streams when the directivity control is performed.

The eighth embodiment can be realized by the same configuration and communication flow as in the seventh embodiment described above. However, the transmission weight calculation method and the transmission power determination method for the base station 110 are different.

A plurality of weights calculated using the following Equation (13) are stored before the base station 110 generates a transmission weight.

[Equation 13]

$$H = U\Sigma V \quad (13)$$

In Equation (13), U denotes an M×M, left singular matrix, E denotes a diagonalization matrix having an eigenvalue of the propagation channel H at diagonal terms, and V denotes an N×N, right singular matrix. A plurality of weights are generated from V.

Figure 10:
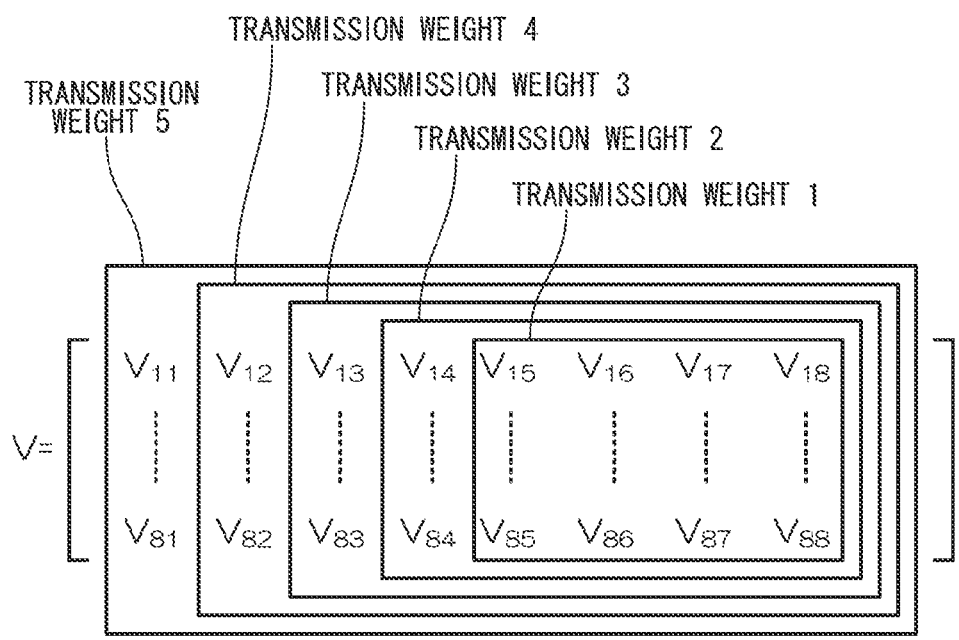
FIG. 10 is a conceptual diagram illustrating an example of a transmission weight in according to an eighth embodiment the present invention.

FIG. 10 is a conceptual diagram illustrating an example of a transmission weight in the eighth embodiment. In FIG. 10, an example in which the number of antennas of the base station is 8 and the number of antennas of the terminal station is 4 is shown. First, transmission weight 1 is the same weight as the transmission weight formed in a null space shown in Equation (9). Further, since the number of streams that can be transmitted by the base station 110 is the number of columns of the matrix other than the transmission weight, the number of streams that can be transmitted is 4 in transmission weight 1.

Meanwhile, transmission weights 2 to 5 are obtained by adding a column vector in order from transmission weight 1. That is, since the number of streams that can be transmitted by the base station 110 increases from transmission weight 2 to transmission weight 5, a transmission capacity of the first communication cell 141 increases. However, when transmission weights 2 to 5 are used, an interference power given to the terminal station of the second communication cell 142 increases (the interference power increases from transmission weight 2 to transmission weight 5). As described above, the plurality of transmission weights are generated.

Next, a method of determining a transmission weight from the plurality of transmission weights will be described. First, an interference power when the transmission weight is used is calculated for each transmission weight. Each transmission power is calculated so that the calculated interference power can be suppressed to be equal to or less than the allowable interference power or the allowable reduction bit for the first communication cell 141. Finally, the transmission capacity of the first communication cell 141 for each transmission weight is calculated using the calculated transmission power and the transmission weight, the transmission weight and the transmission power in which the transmission capacity is largest are determined as a transmission weight and a transmission power, and then the transmission is performed.

Thus, according to the eighth embodiment, it is possible to increase the transmission capacity using the transmission power and the transmission weight in which the transmission capacity of the first communication cell 141 is maximized.

I. Ninth Embodiment

Next, a ninth embodiment of the present invention will be described. The present ninth embodiment is characterized in that communication of the first communication cell 141 ends according to a communication end time of the second communication cell 142. Specifically, as the base station 110 acquires a data length described in a transmission request signal transmitted from the base station 120 and generates a transmission signal having a data length equal to or less than the acquired data length, communication of the first communication cell 141 ends before the communication end time of the second communication cell 142.

According to the first to ninth embodiments, in a system in which communication is performed through autonomous distributed control such as a wireless LAN, interference with an adjacent communication cell is suppressed through transmission power control and directivity control, thereby increasing transmission capacity, in addition to the time and the frequency channel that are radio resources.

J. Tenth Embodiment

Next, a tenth embodiment of the present invention will be described. The tenth embodiment is characterized in that, in a communication environment in which there are three or more communication cells, interference with one of the communication cells is suppressed by base stations of the other communication cells of the plurality of communication cells through the transmission power or directivity control, thereby enabling a plurality of communications to be simultaneously performed and the transmission capacity to be increased.

Figure 11:
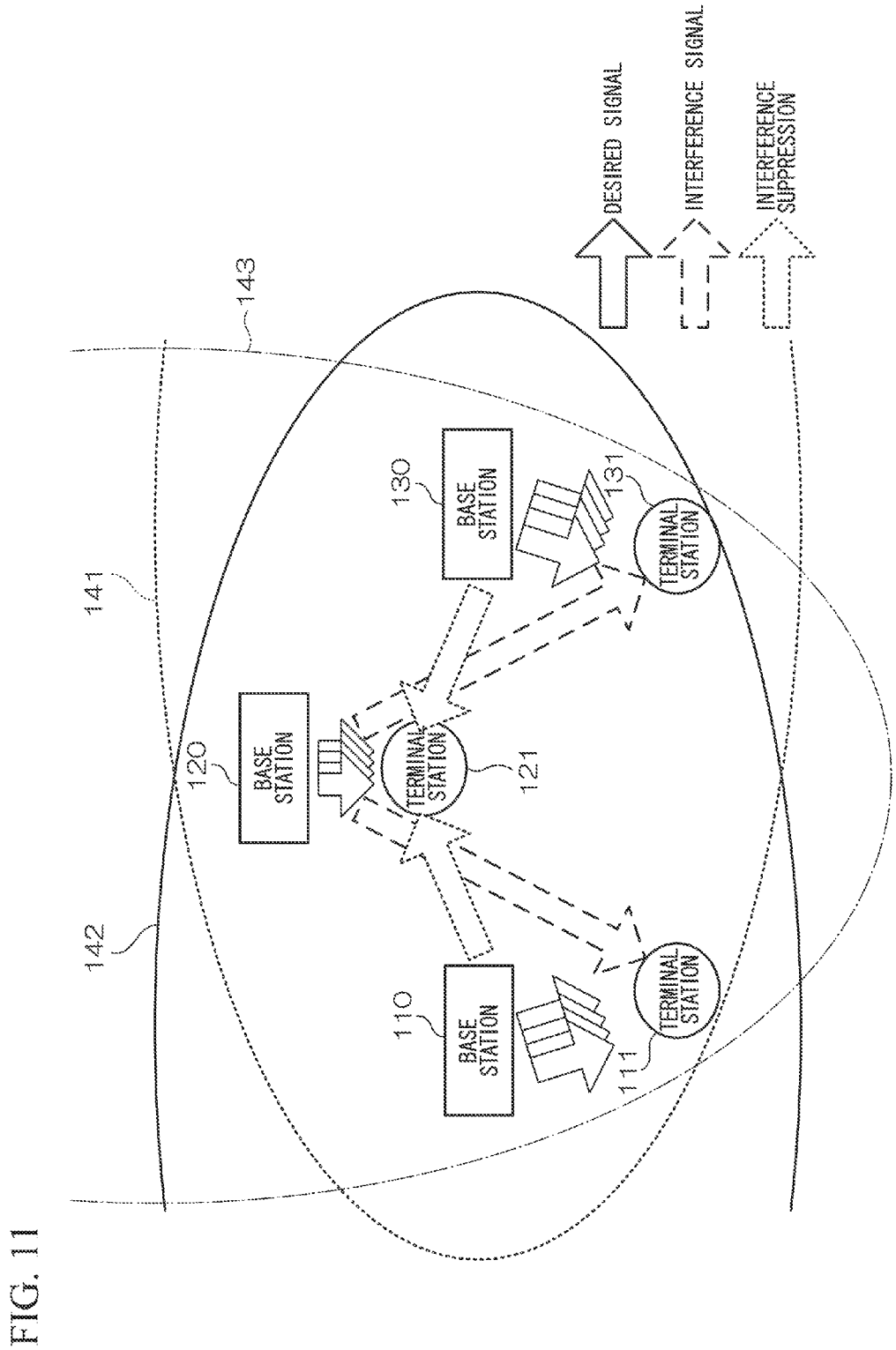
FIG. 11 is a conceptual diagram illustrating a wireless communication method in which a base station of a first communication cell and a base station of a third communication cell according to the present invention suppress interference with the terminal station of a second communication cell, and simultaneously, the base station of the first communication cell and the base station of the third communication cell perform transmission to terminal stations of their cells.

FIG. 11 is a conceptual diagram illustrating a wireless communication method in which a base station of a first communication cell and a base station of a third communication cell according to the present invention suppress interference with the terminal station of a second communication cell, and simultaneously perform transmission to terminal stations of their cells. In FIG. 11, the first communication cell 141, the second communication cell 142 and the third communication cell 143 using the same frequency channel are adjacent. A base station 110 and a terminal station 111 belong to the first communication cell 141. A base station 120 and a terminal station 121 belong to the second communication cell 142. A base station 130 and a terminal station 131 belong to the third communication cell 143.

Figure 12:
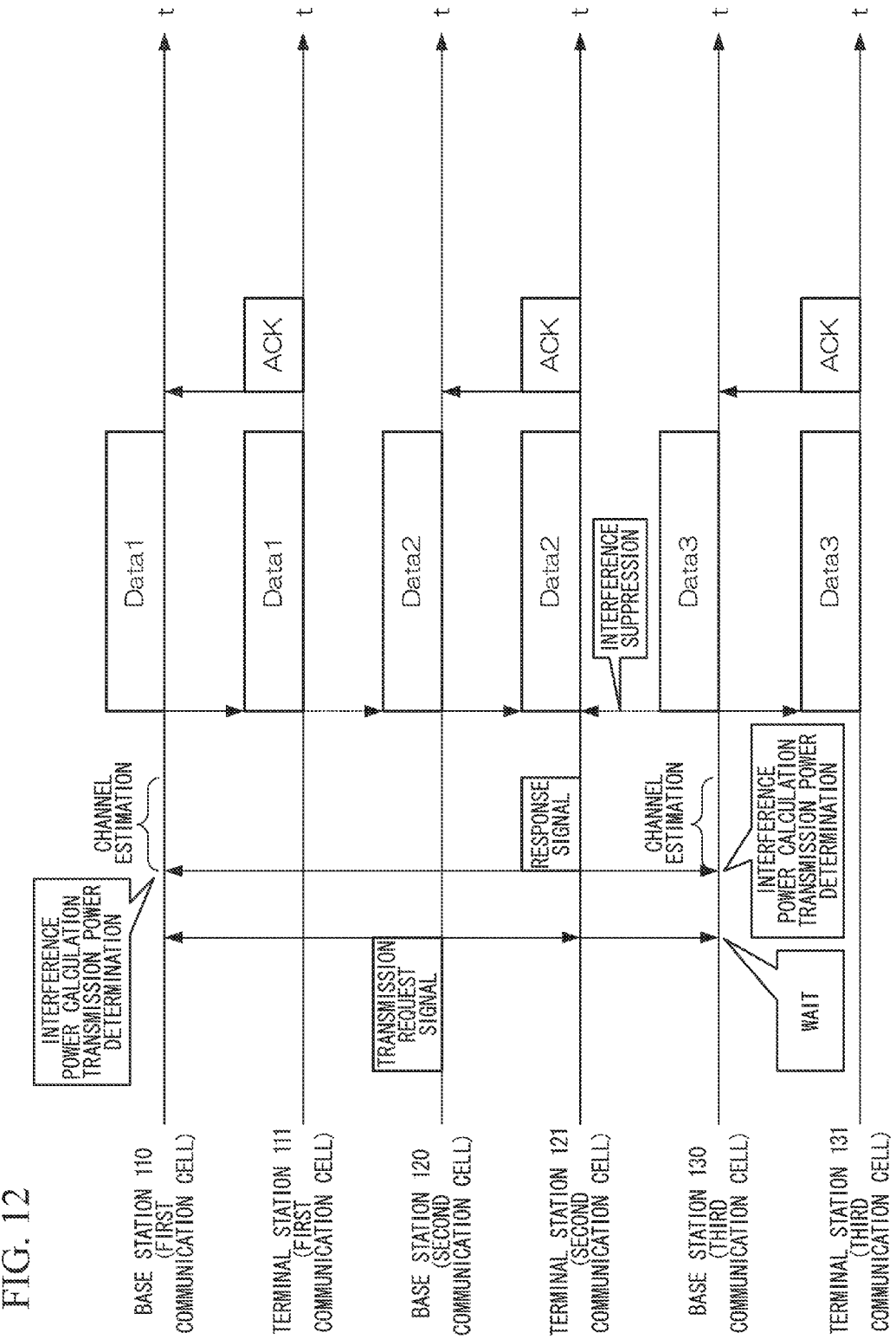
FIG. 12 is a sequence diagram illustrating a communication flow according to a tenth embodiment of the present invention.

FIG. 12 is a sequence diagram illustrating a communication flow according to the tenth embodiment. In the tenth embodiment, the base stations 110, 120, and 130 and the terminal stations 111, 121, and 131 are included as shown in FIG. 11, and communication is performed according to the communication flow shown in FIG. 12.

In FIG. 12, first, the base station 120 transmits a transmission request signal to the terminal station 121. The terminal station 121 receiving the transmission request signal transmits a response signal to the base station 120. Meanwhile, when the base stations 110 and 130 receive the transmission request signal of the base station 120, the base stations 110 and 130 wait for receiving the response signal transmitted from the terminal station 121. When the base stations 110 and 130 receive the response signal transmitted from the terminal station 121, the base stations 110 and 130 perform propagation channel estimation from the response signal. The base stations 110 and 130 calculate a transmission weight to suppress interference with the terminal station 121 using the propagation channel estimated through the propagation channel estimation. The base stations 110 and 130 calculate an interference power amount when the transmission weight is used, and perform determination of the transmission power when the interference power is equal to or more than a threshold.

Here, a transmission power determination method and a transmission weight determination method may be any of the methods that have been described in the above-described embodiments.

Next, the base station 120 receiving the response signal transmits data Data2 to the terminal station 121. Meanwhile, the base stations 110 and 130 receiving the response signal transmit Data1 and Data3 to the terminal stations of their cells using the same time and frequency channel as those used for the transmission of the data Data2, the determined transmission weight and the transmission power. Finally, the respective terminal stations 121, 111 and 131 transmit an ACK signal indicating that the communication has ended to their base stations (the base stations belonging to the same communication cells) 120, 110 and 130.

Thus, according to the tenth embodiment, the base stations 110 and 130 can perform the interference suppression for the second communication cell by performing the transmission power control or the transmission power control as well as the directivity control, and the base stations 110 and 130 can perform transmission to the terminal stations of their communication cells while suppressing the interference with the communication performed by the second communication cell.

Next, the eleventh to fourteenth embodiments of the present invention using a plurality of frequency channels will be described with reference to the drawings.

Figure 13:
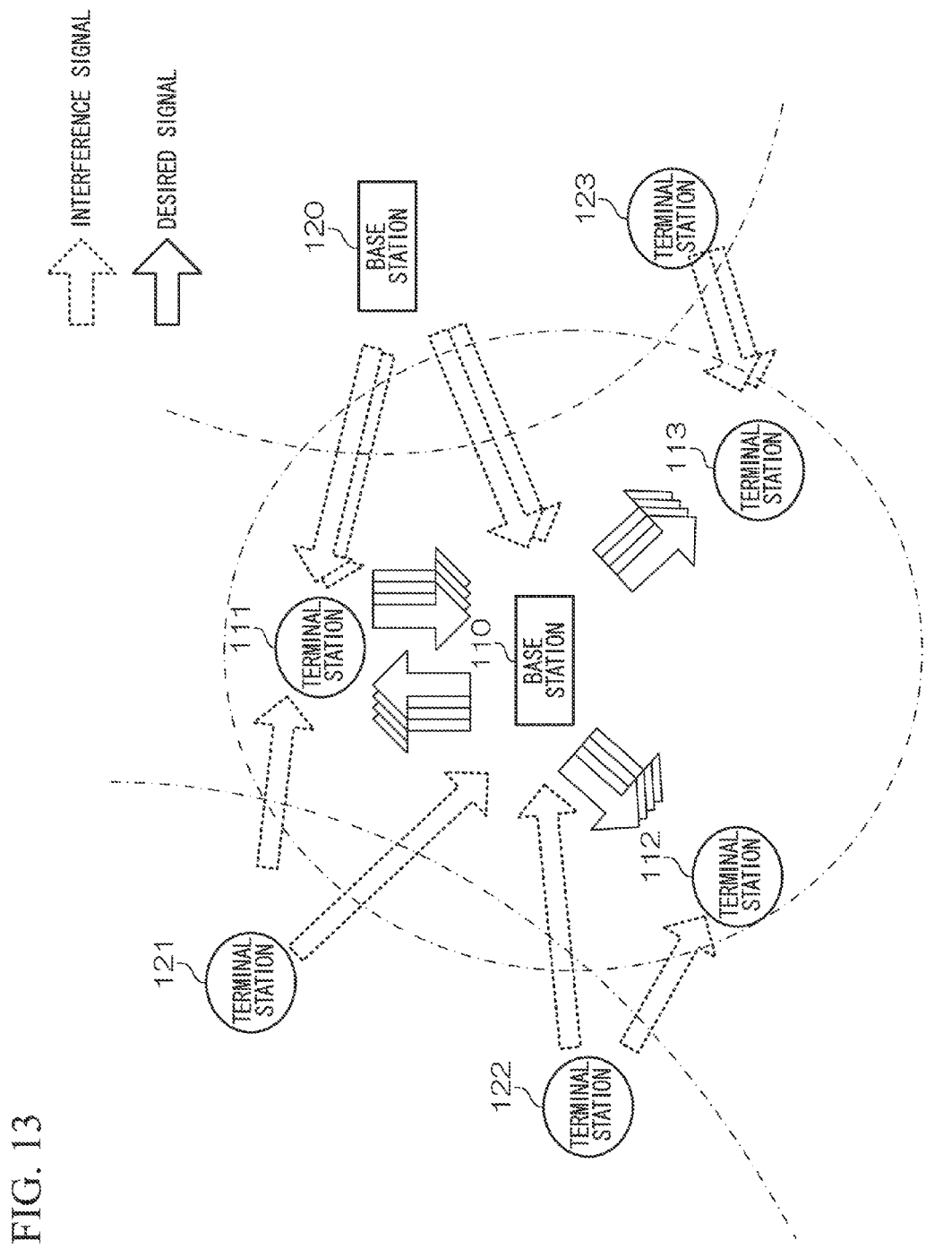
FIG. 13 is a conceptual diagram illustrating a wireless communication method using interference information according to the present invention.

FIG. 13 is a conceptual diagram illustrating a wireless communication method using interference information according to the present invention. In FIG. 13, an environment in which data transmission and reception are performed from a base station 110 to terminal stations 111 to 113 using four frequency channels f1 to f4 of 20 MHz is shown.

Further, a base station 120 and a terminal station 123 belonging to an adjacent communication cell perform wireless communication using frequency channels f1 to f2, and a terminal station 121 and a terminal station 122 belonging to another adjacent communication cell perform wireless communication using a frequency channel f3. Further, the base station 120 and the terminal station 121 interfere with the base station 110 and the terminal station 111 (as indicated by dotted arrows), the terminal station 122 interferes with the base station 110 and the terminal station 112 (as indicated by dotted arrows), and the terminal station 123 interferes with the terminal station 113 (as indicated by dotted arrows).

K. Eleventh Embodiment

Figure 14:
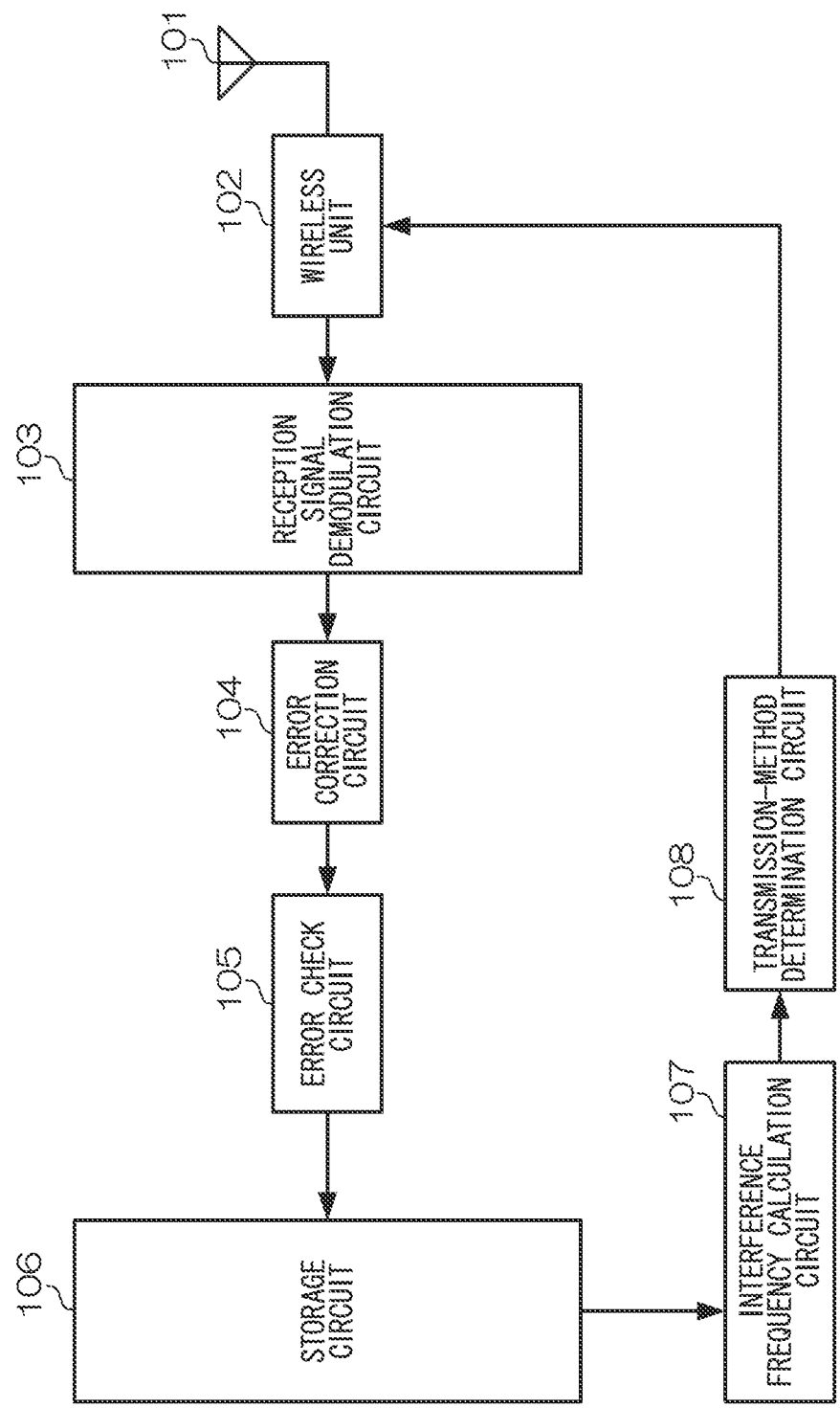
FIG. 14 is a block diagram illustrating a configuration of a wireless apparatus (of a terminal station) according to an eleventh embodiment of the present invention.

FIG. 14 is a block diagram illustrating a configuration of a wireless apparatus (of a terminal station) according to an eleventh embodiment of the present invention. In FIG. 14, the wireless apparatus includes an antenna 101, a wireless unit 102, a reception signal demodulation circuit 103, an error correction circuit 104, an error check circuit 105, a storage circuit 106, an interference frequency calculation circuit 107, and a transmission-method determination circuit 108.

The antenna 101 and the wireless unit 102 perform transmission and reception of a radio signal. The reception signal demodulation circuit 103 performs demodulation of a received signal. The error correction circuit 104 performs error correction of the signal. The error check circuit 105 checks presence or absence of an error in the received signal using a previously inserted FCS (Frame Check Sequence). These are circuits used for a wireless unit, as in the related art.

Next, the storage circuit 106 stores information indicating presence or absence of an error obtained from a result of the error check circuit 105. Stored information includes the information indicating presence or absence of an error in the received signal obtained from the result of the error check circuit 105, a reception time at which the received signal including the information indicating presence or absence of an error was obtained, a received frequency channel, and an address of transmission station, together. Further, the stored information may be a storage form to update the stored information. That is, the information may be stored to be overwritten to information after a certain time has elapsed after storage.

The interference frequency calculation circuit 107 calculates an interference frequency based on the information stored in the storage circuit 106. The transmission-method determination circuit 108 determines the transmission method in the wireless unit 102 based on the calculated interference frequency.

FIG. 15 is a conceptual diagram illustrating an example of the information stored in the storage circuit 106 according to the eleventh embodiment. In FIG. 15, presence or absence of the error for each address of the transmission station, a reception time t, and frequency channels f1 to f4 are shown. "O" indicates a state in which there is no error and "X" indicates a state in which there is an error. While, in this example, a finite number of reception times t are stored, the reception times t may be stored unlimitedly or only certain designated times may be stored.

Next, a method of calculating the interference frequency in the interference frequency calculation circuit 107 will be described with reference to the information indicating presence or absence of the error shown in FIG. 15. A definition of a first interference frequency will be described. An interference frequency R is represented by a quotient obtained by dividing the number Ni of received signals having errors among a number $N_{all}$ of stored received signals by $N_{all}$, as shown in Equation (14). The number Ni of received signals having errors may be calculated by the number of received signals having no error among the number of received signals $N_{all}$.

[Equation 14]

$$R = \frac{Ni}{N_{all}} \quad (14)$$

Next, a definition of a second interference frequency will be described. The second interference frequency is an interference frequency calculated by limiting the stored information used to calculate the interference frequency. That is, the second interference frequency is calculated using a part of the stored information indicating presence or absence of an error, similar to the definition of the first interference frequency. Use of this method enables it to calculate the interference frequency only within a specific time. Accordingly, it is possible to calculate the interference frequency in more detail.

Further, the interference frequencies may be sequentially calculated using the definition of the second interference frequency and statistical information of the interference frequencies may be used as the interference frequency.

Next, the transmission-method determination circuit 108 will be described. The transmission-method determination circuit 108 determines the transmission method using the interference frequency described above. Referring to FIG. 15, when a signal transmitted from the transmission station address 1 is received, there are many errors. It is assumed that an interference frequency is 4/9 and the interference frequency is high.

In this case, as the transmission method, any one or both of:
(1) change to the other frequency channel, and
(2) adjustment of a modulation scheme and a coding rate
are used to perform error reduction.

However, when the change to the other frequency channel is used as in (1), there may be many errors in previously changed frequency channels. However, it is highly likely to be effective since a frequency channel having relatively fewer errors is expected to be obtained through repetition of such a channel change.

Figure 16:
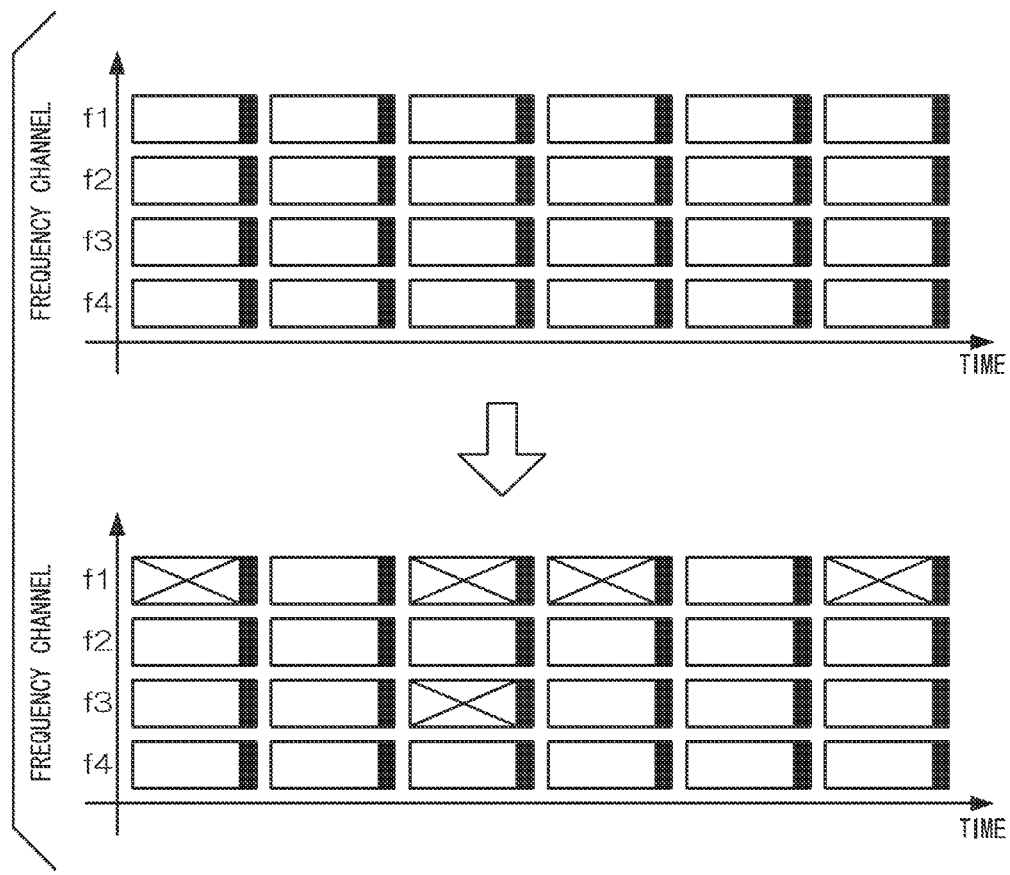
FIG. 16 is a conceptual diagram illustrating an example of a block signal in which an error is generated using a check bit.

Specifically, a description will be given with reference to the drawings. FIG. 16 is a conceptual diagram illustrating an example of a block signal with an error using a check bit. A transmission signal is shown in an upper part of FIG. 16, and a reception signal is shown in a lower part of FIG. 16. "X" indicates an erroneous block signal. A black portion of each block signal is an FCS previously inserted to check the presence or the absence of the error in the reception signal. Hereinafter, an example of a wireless communication method using interference information will be described with reference to FIG. 16.

Figure 17:
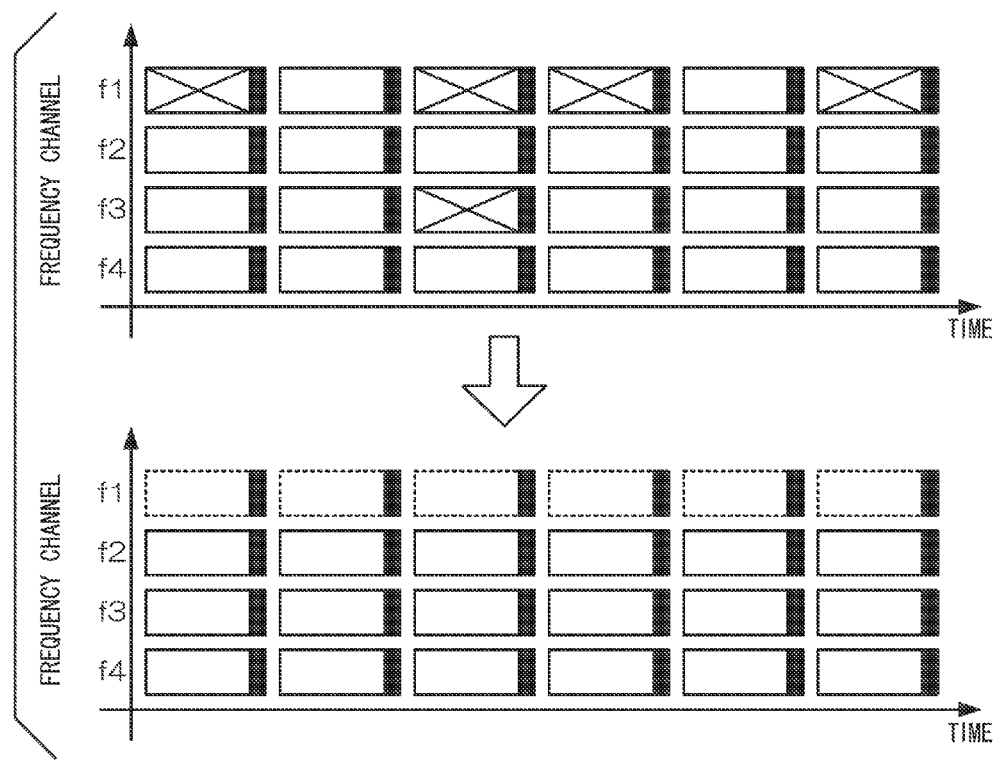
FIG. 17 is a conceptual diagram illustrating an example in which a modulation scheme and a coding rate are changed for a frequency channel whose interference frequency is high and then transmission is performed.

FIG. 17 is a conceptual diagram illustrating an example in which a modulation scheme and a coding rate are changed for a frequency channel whose interference frequency is high and then transmission is performed. If an interference frequency of a frequency channel f1 is assumed to be high, the modulation scheme is changed from 64QAM to QPSK for the frequency channel f1 whose interference frequency is high and then transmission is performed.

Further, the coding rate rather than the modulation scheme may be changed from 5/6 to 2/3 to increase reception probability. Further, both may be combined to increase the reception probability. The eleventh embodiment is accomplished by such a method and combination.

Figure 18:
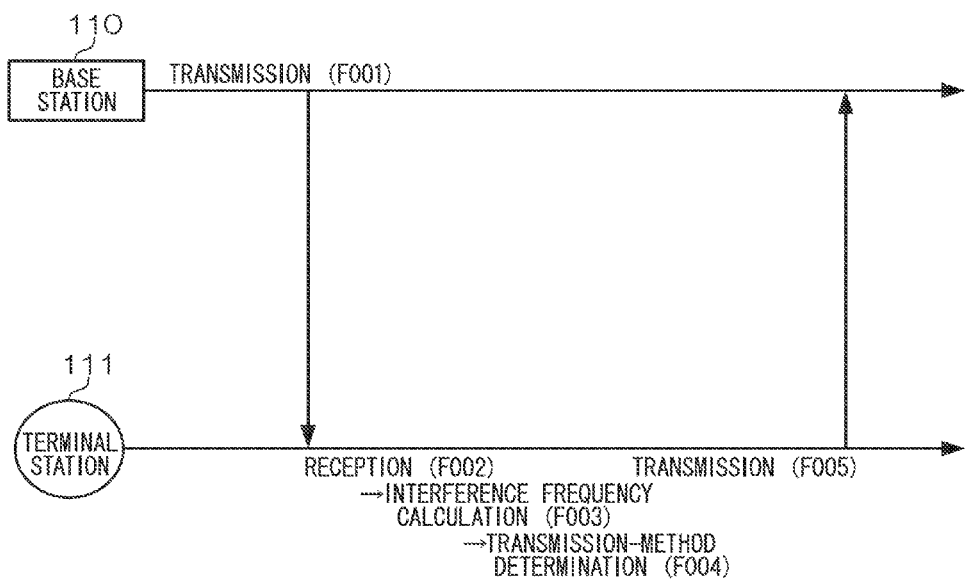
FIG. 18 is a sequence diagram illustrating a communication flow according to the eleventh embodiment of the present invention.

Next, FIG. 18 is a sequence diagram illustrating a communication flow according to the eleventh embodiment. A base station 110 is assumed to perform data transmission to a terminal station 111 using frequency channels f1 to f4. First, the base station 110 transmits a transmission signal to the terminal station 111 (F001). The terminal station 111 receives the signal (F002) and calculates an interference frequency from the received signal (F003). Also, an information transmission method is determined based on the calculated interference frequency (F004). The terminal station 111 performs transmission to the base station 110 using the determined transmission method (F005). Communication is performed according to this flow.

L. Twelfth Embodiment

Next, a twelfth embodiment of the present invention will be described.

The twelfth embodiment is characterized in that an interference frequency of each frequency channel is calculated by performing error check for each frequency channel and a transmission method that provides a high throughput is determined.

Figure 19:
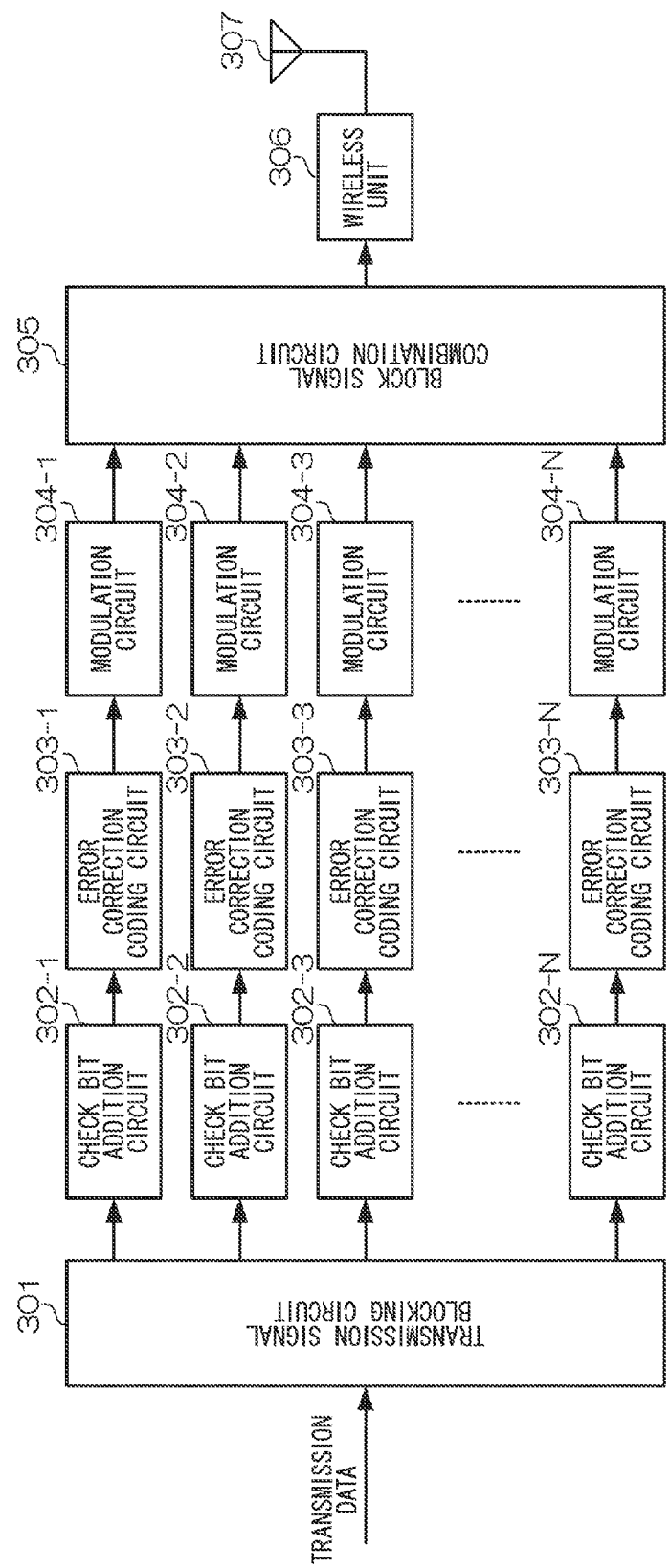
FIG. 19 is a block diagram illustrating a configuration of a wireless apparatus (of a base station) according to a twelfth embodiment of the present invention.

FIG. 19 is a block diagram illustrating a configuration of a wireless apparatus (of a base station) according to the twelfth embodiment of the present invention. In FIG. 19, the wireless apparatus includes a transmission signal blocking circuit 301, check bit addition circuits 302-1 to 302-N, error correction coding circuits 303-1 to 303-N, modulation circuits 304-1 to 304-N, a block signal combination circuit 305, a wireless unit 306, and an antenna 307.

The transmission signal blocking circuit 301 divides a transmission signal into frequency channels. Each of the check bit addition circuits 302-1 to 302-N adds a check bit to each frequency channel. Each of the error correction coding circuits 303-1 to 303-N performs error correction coding for each frequency channel. Each of the modulation circuits 304-1 to 304-N modulates the transmission signal coded by the error correction coding for each frequency channel. The block signal combination circuit 305 combines the modulated transmission signal with each blocked signal. The wireless unit 306 and the antenna 307 transmit the modulated transmission signal.

Next, a blocking method will be described. A signal transmitted from the base station 110 to the terminal station 111 is considered. The signal transmitted from the base station 110 to the terminal station 111 is transmitted using frequency channels f1 to f4. In this case, a transmission signal of frequency channels f1 to f4 is divided into the frequency channels f1 to f4.

Further, if a frequency band to be divided on the reception side is known, it is unnecessary to perform division into the frequency channels f1 to f4. Further, if positions of the transmission signals are known, respective positions of the transmission signals may be rearranged using any method. Further, while the method of performing division for each frequency channel has been described in the above-described example, the signal may be divided in a time direction.

Next, the block signal combination circuit 305 will be described. As shown in FIG. 19, the respective signal blocks may be combined in order, but when a combination order is known on the reception side, the signal blocks may be combined in any order.

Figure 20:
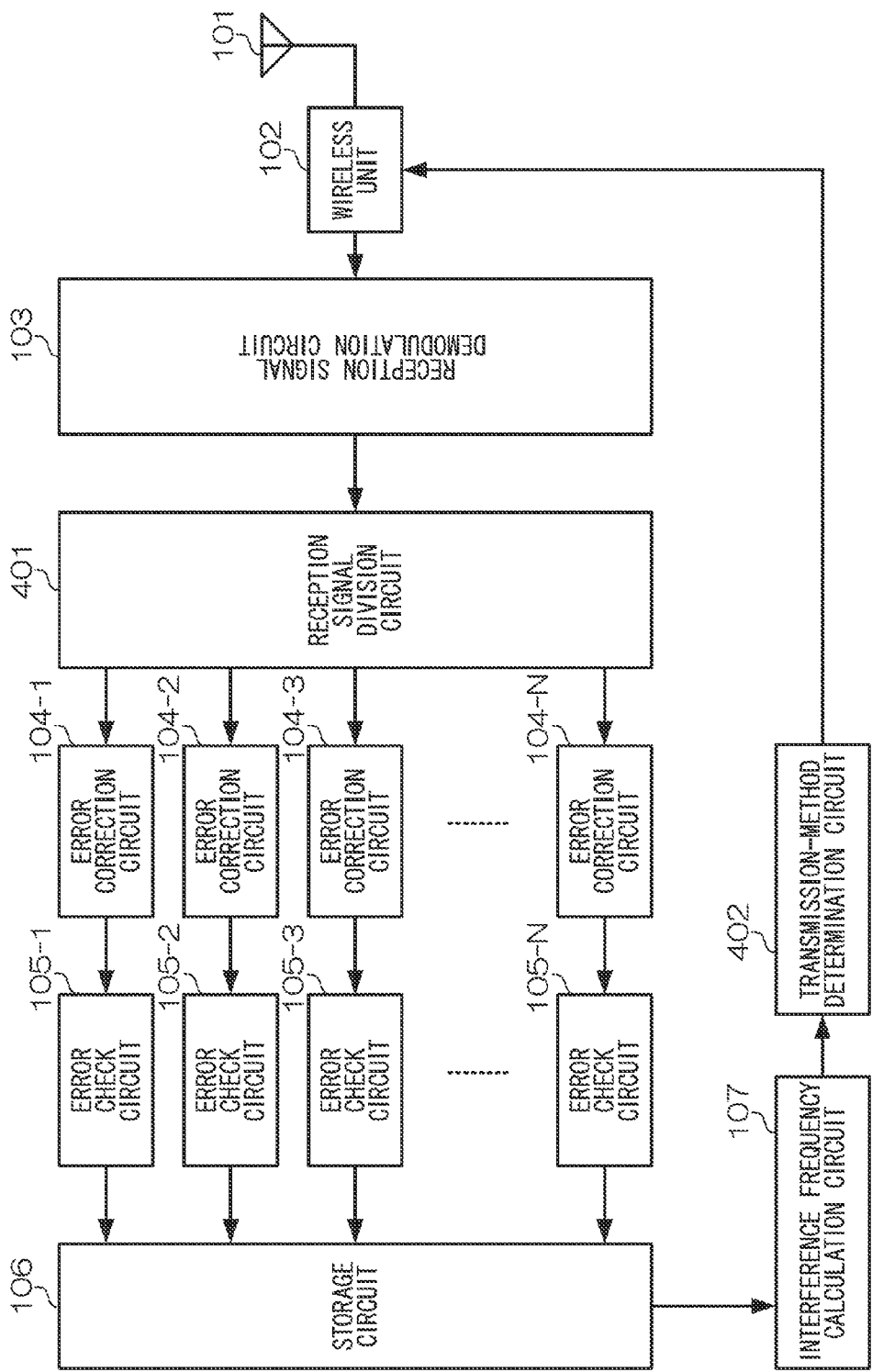
FIG. 20 is a block diagram illustrating a configuration of a wireless apparatus (of a terminal station) according to the twelfth embodiment.

Further, FIG. 20 is a block diagram illustrating a configuration of a wireless apparatus (of a terminal station) according to the twelfth embodiment. In FIG. 20, the wireless apparatus (of the terminal station) includes an antenna 101, a wireless unit 102, a reception signal demodulation circuit 103, error correction circuits 104-1 to 104-N, error check circuits 105-1 to 105-N, a storage circuit 106, an interference frequency calculation circuit 107, a reception signal division circuit 401, and a transmission-method determination circuit 402. Further, the same reference numerals are assigned to parts corresponding to those in FIG. 14 and a description thereof will be omitted.

The reception signal division circuit 401 performs reception signal division using a previously determined division method. The transmission-method determination circuit 402 may select a frequency channel to be used, in addition to the transmission-method determination circuit 108 of the eleventh embodiment described above. That is, the transmission-method determination circuit 402 may recognize the interference state of each frequency channel by calculating an interference frequency for each frequency. Accordingly, it is possible to perform efficient communication by performing communication using a frequency channel whose interference frequency is low.

Figure 21:
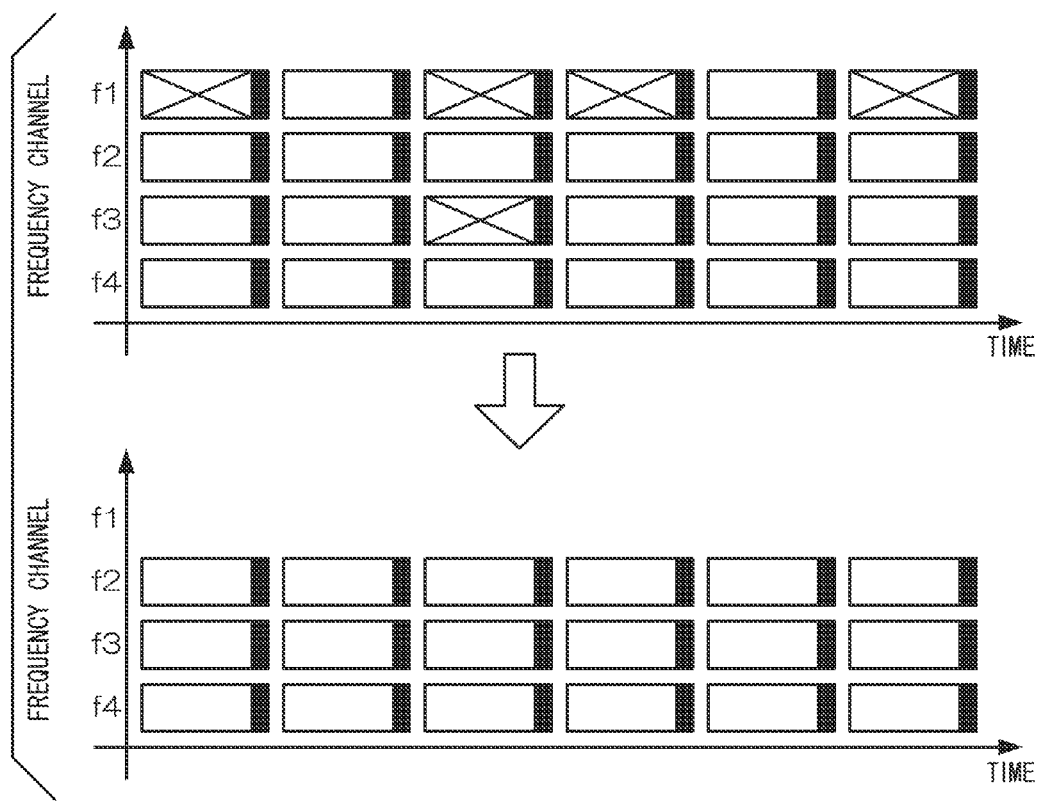
FIG. 21 is a conceptual diagram illustrating a method of performing communication using a frequency channel whose interference frequency is low according to the twelfth embodiment.

FIG. 21 is a conceptual diagram illustrating a method of performing communication using a frequency channel whose interference frequency is low according to the twelfth embodiment. Since the interference frequency is high (there are many Xs) in a frequency channel whose interference frequency is high f1 as shown in an upper part of FIG. 21, communication for the frequency channel f1 is performed using the frequency channels f2 to f4 other than the interference channel, as shown in a lower part of FIG. 21. Accordingly, it is possible to reduce retransmission and prevent throughput deterioration caused by the retransmission.

M. Thirteenth Embodiment

Next, a thirteenth embodiment of the present invention will be described.

The thirteenth embodiment is characterized in that error check is performed for each frequency channel, a transmission station is notified of a result of the error check as an extended block ACK signal, and the transmission station recognizes presence or absence of an error of each block, calculates an interference frequency of each frequency channel based on recognition information, and determines a transmission method using the calculated interference frequency. Accordingly, it is possible to determine a transmission method that provides a high throughput.

In the eleventh or twelfth embodiment described above, the interference frequency for the terminal station 111 that is a reception station can be calculated, but information of the interference frequency of the base station 110 that is a transmission party to which transmission is to be performed cannot be obtained. However, it is effective to recognize a characteristic of the adjacent communication cell. In the thirteenth embodiment, the transmission party is notified of its interference state or interference frequency information of a transmission station using the extended block ACK signal, making it possible to perform transmission in consideration of the interference frequency given to the transmission party and to determine a transmission method that provides a high throughput.

Figure 22:
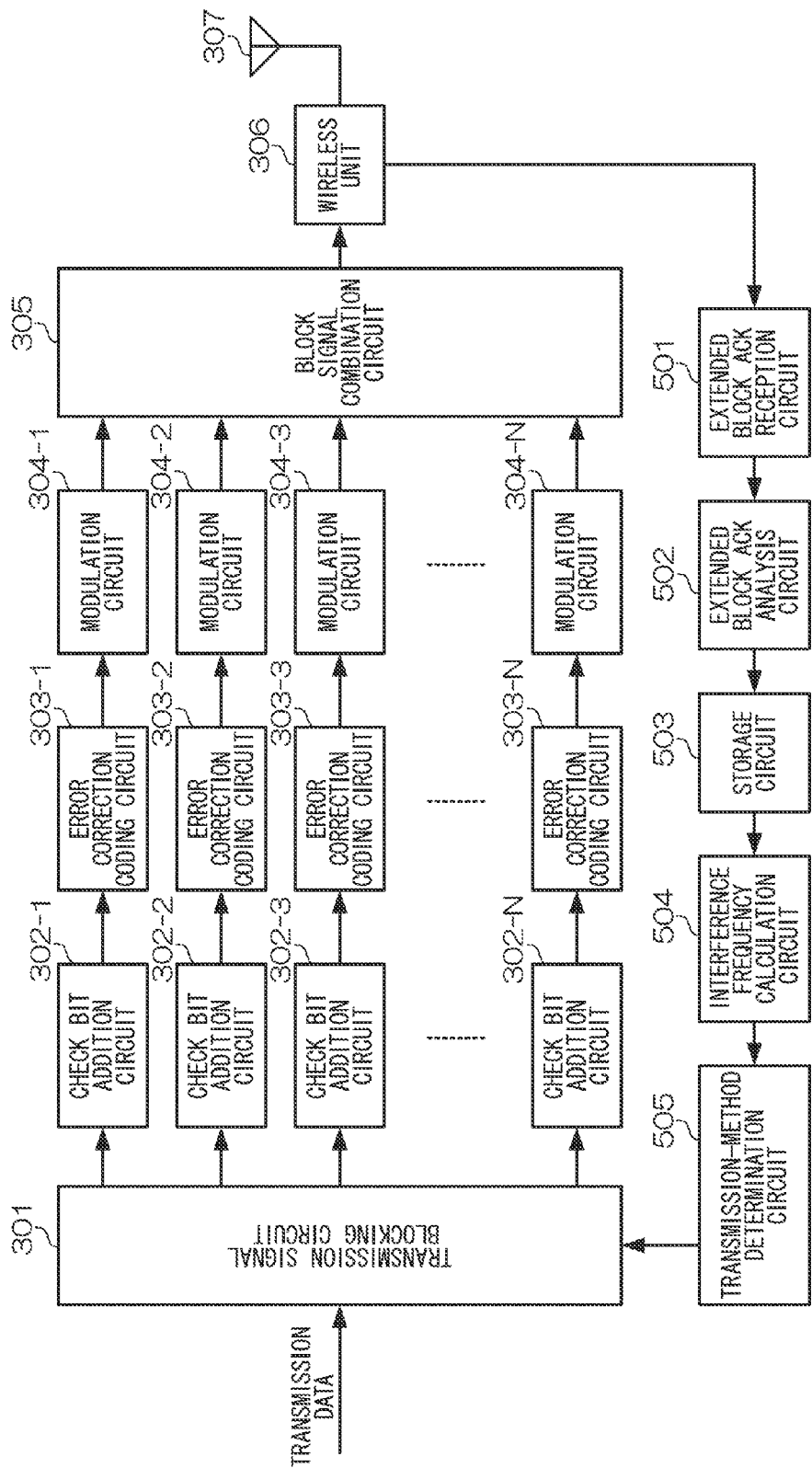
FIG. 22 is a block diagram illustrating a configuration of a wireless apparatus (of a base station) according to a thirteenth embodiment of the present invention.

FIG. 22 is a block diagram illustrating a configuration of a wireless apparatus (of a base station) according to the thirteenth embodiment. In FIG. 22, the wireless apparatus (of the base station) includes a transmission signal blocking circuit 301, check bit addition circuits 302-1 to 302-N, error correction coding circuits 303-1 to 303-N, modulation circuits 304-1 to 304-N, a block signal combination circuit 305, a wireless unit 306, an antenna 307, an extended block ACK reception circuit 501, an extended block ACK analysis circuit 502, a storage circuit 503, an interference frequency calculation circuit 504, and a transmission-method determination circuit 505. Further, the same reference numerals are assigned to parts corresponding to those in FIG. 19 and a description thereof will be omitted.

The extended block ACK reception circuit 501 is a circuit for receiving an extended block ACK signal generated by a wireless apparatus (of a terminal station) shown in FIG. 24, which will be described below (a structure of the extended block ACK signal will be described below). The extended block ACK analysis circuit 502 analyzes the received extended block ACK signal and acquires presence or absence of an error in each block or either presence or absence (either information indicating that there is an error or information indicating that there is no error) described in the extended block ACK signal. Further, since the interference frequency information can also be described in the extended block ACK signal, interference frequency information of each frequency channel may also be acquired.

The storage circuit 503 stores the information indicating presence or absence of an error in each block or the interference frequency information of each frequency channel from the extended block ACK analysis circuit 502. The interference frequency calculation circuit 504 calculates an interference frequency based on the information stored in the storage circuit 503. The transmission-method determination circuit 505 determines a division size for the transmission signal blocking circuit 301 from the calculated interference frequency, in addition to the above-described transmission-method determination circuit 108. It is possible to perform efficient transmission by changing the division size. Further, the division size may be changed, for example, by changing information indicating a data length contained in a preamble of the block.

Figure 23:
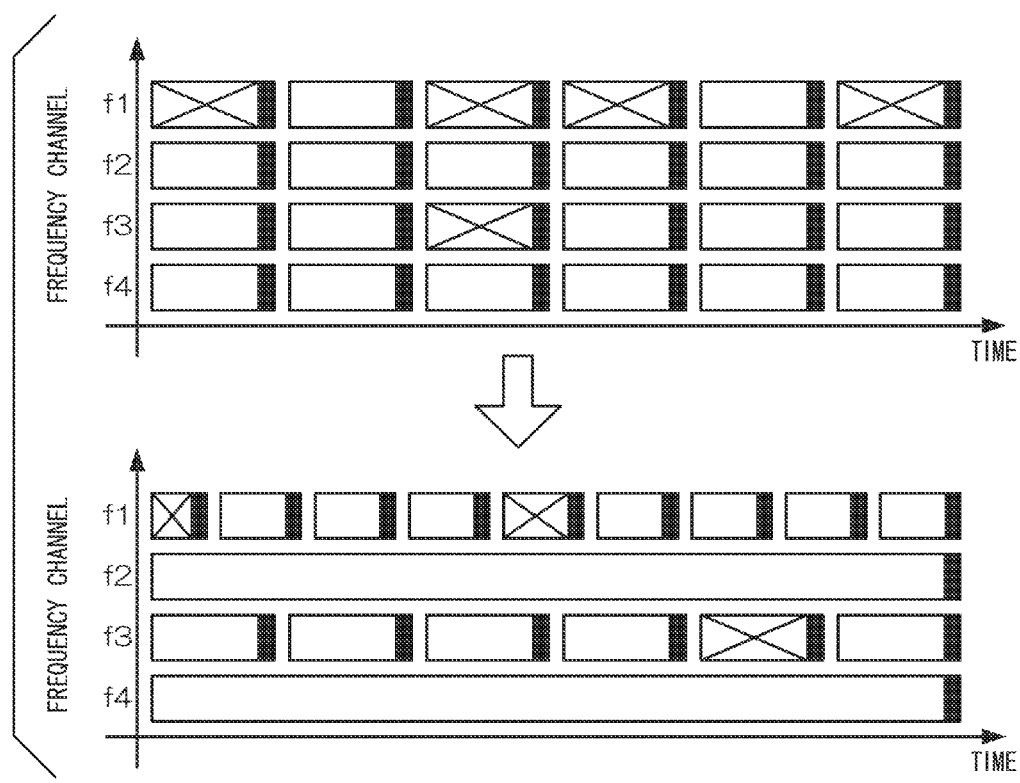
FIG. 23 is a conceptual diagram illustrating a method of changing a division size in the thirteenth embodiment.

FIG. 23 is a conceptual diagram illustrating a method of changing a division size in the thirteenth embodiment. When division of transmission data is performed, the division size is changed based on the interference frequency. For an interference channel whose interference frequency is low, a large division size is adopted to reduce an overhead due to a check bit, thereby increasing efficiency of transmission. For an interference channel whose interference frequency is high, a small division size is adopted to minimize the error, thereby increasing the efficiency of the transmission.

For example, since an interference frequency of a frequency channel f1 is high (there are many Xs) as shown in an upper part of FIG. 23, a division size of the frequency channel f1 (an interference channel) is small, as shown in a lower part of FIG. 23. On the other hand, since interference frequencies of frequency channels f2 and f4 are low (there are no Xs) as shown in the upper part of FIG. 23, division sizes of the frequency channels f2 and f4 are set to be large, as shown in the lower part of FIG. 23.

Figure 24:
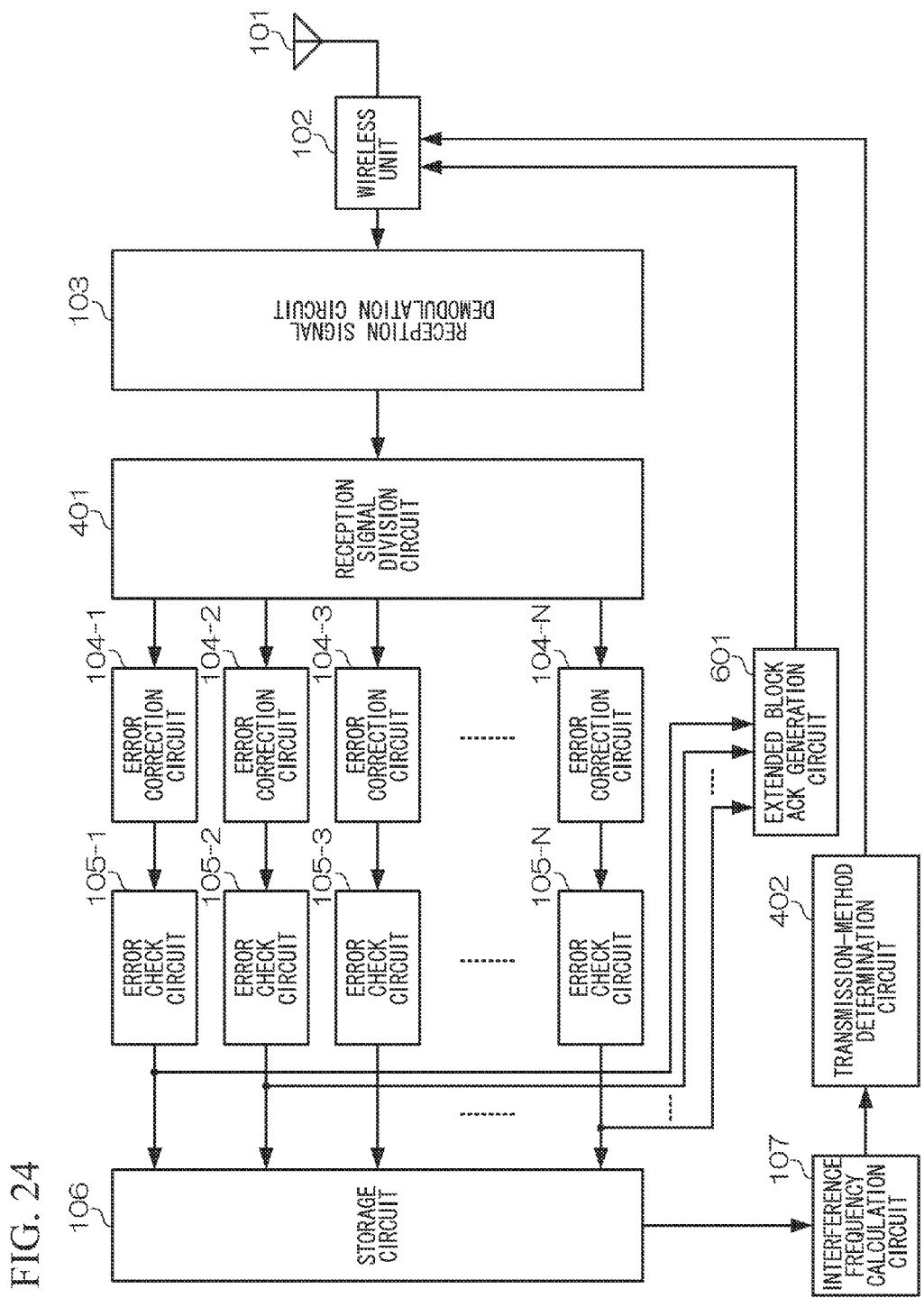
FIG. 24 is a block diagram illustrating a configuration of a wireless apparatus (of a terminal station) according to the thirteenth embodiment.

FIG. 24 is a block diagram illustrating a configuration of a wireless apparatus (of a terminal station) according to the thirteenth embodiment. In FIG. 24, the wireless apparatus (of the terminal station) includes an antenna 101, a wireless unit 102, a reception signal demodulation circuit 103, error correction circuits 104-1 to 104-N, error check circuits 105-1 to 105-N, a storage circuit 106, an interference frequency calculation circuit 107, a reception signal division circuit 401, a transmission-method determination circuit 402, and an extended block ACK generation circuit 601.

The extended block ACK generation circuit 601 generates information indicating presence or absence of the error in each block, or either information indicating the presence or information indicating the absence (information indicating that there is an error or information indicating that there is no error). Further, the same reference numerals are assigned to parts corresponding to those in FIG. 20 and a description thereof will be omitted.

Figure 25:
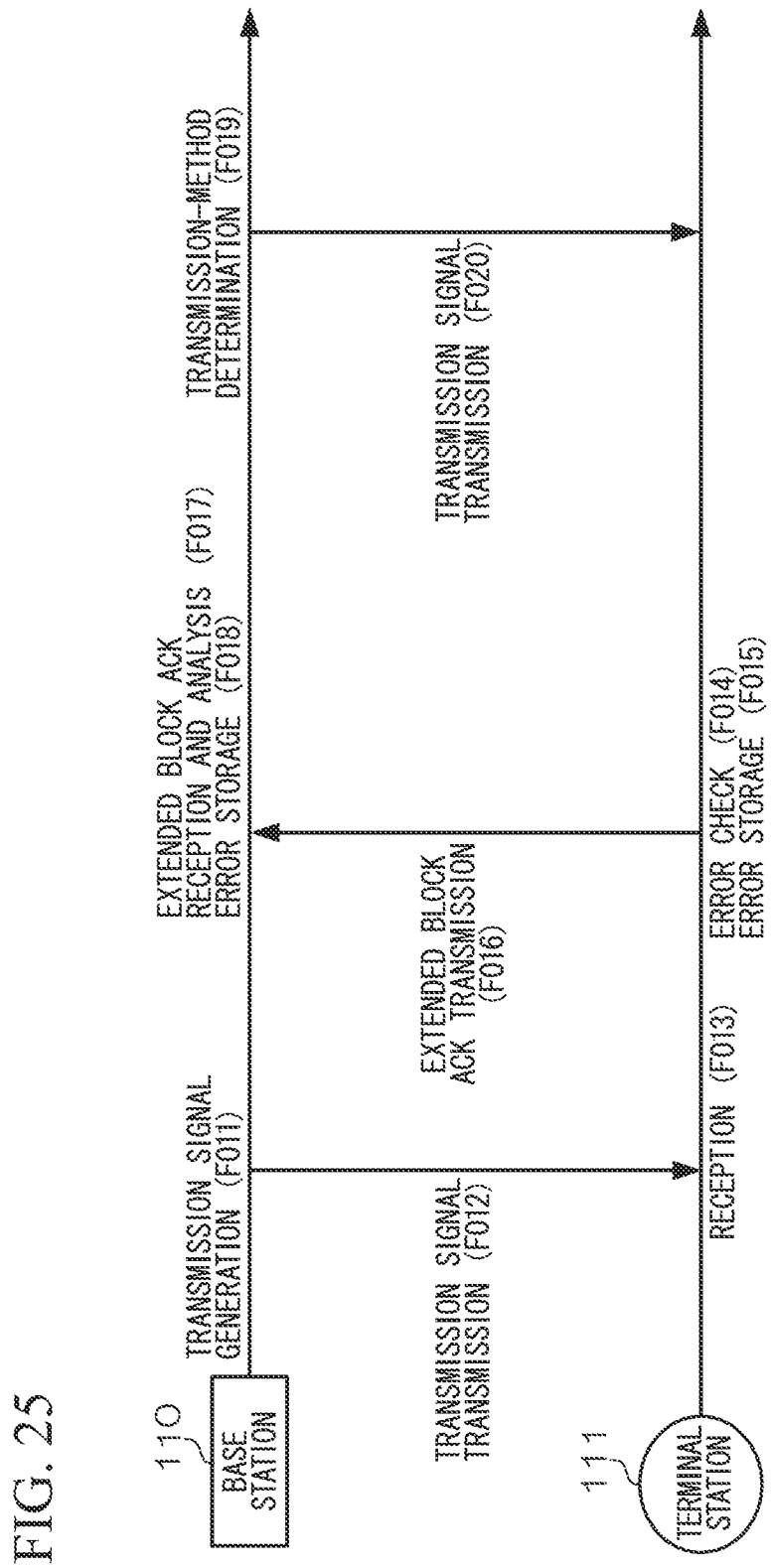
FIG. 25 is a sequence diagram illustrating a communication flow in the thirteenth embodiment.

FIG. 25 is a sequence diagram illustrating a communication flow in the thirteenth embodiment. First, the base station 110 performs generation of a transmission signal (F011), and transmits the generated transmission signal to the terminal station 111 (F012).

The terminal station 111 receives the transmission signal transmitted from the base station 110 (F013), divides the received signal according to frequency channels f1 to f4 and transmission timings to perform error check on each block of the received signal, and performs error check on each divided block signal using a check bit (F014). Next, the terminal station 111 stores the interference frequency channel and the interference timing as the interference information from information of the erroneous block (F015). Also, the terminal station 111 transmits information of each block having no error as the extended block ACK signal to the base station 110 (F016). That is, when the terminal station 111 transmits the extended block ACK signal of each block, the terminal station 111 transmits the extended block ACK signal using a previously designated frequency channel.

The base station 110 performs reception and analysis of the extended block ACK signal (F017), and stores the interference frequency channel and the interference timing based on the information of the block having no error (F018). Next, the base station 110 calculates an interference frequency for each wireless apparatus based on the stored interference frequency information, determines a transmission method for each wireless apparatus (F019), and transmits the transmission signal according to the transmission method (F020).

The transmission and the check can be performed and the interference frequency can be acquired for each block by performing the above flow. The transmission method can be changed according to the interference frequency.

Further, in the thirteenth embodiment, a method of transmitting the extended block ACK signal may include a method of transmitting the extended block ACK signal using the same received frequency channel. In this case, since there is no change in the frequency channel, the extended block ACK signal can be transmitted through simple control. Further, another method of transmitting the extended block ACK signal may include a method of transmitting the extended block ACK signal using a frequency channel having fewer errors based on the interference frequency information of each frequency channel stored in the storage circuit 106.

Further, still another method of transmitting the extended block ACK signal may include a method of selecting a frequency channel having the least error based on information within a certain time of the interference frequency information of each frequency channel stored in the storage circuit 106, i.e., a history or statistical information of the interference frequency information when the extended block ACK signal of each block is transmitted, and transmitting the extended block ACK signal using the selected frequency channel. Further, in this case, the transmission method may be determined using any certain time. For example, the ACK transmission method may be determined using information in the same time zone of a previous day.

N. Fourteenth Embodiment

Next, a fourteenth embodiment of the present invention will be described.

Figure 26:
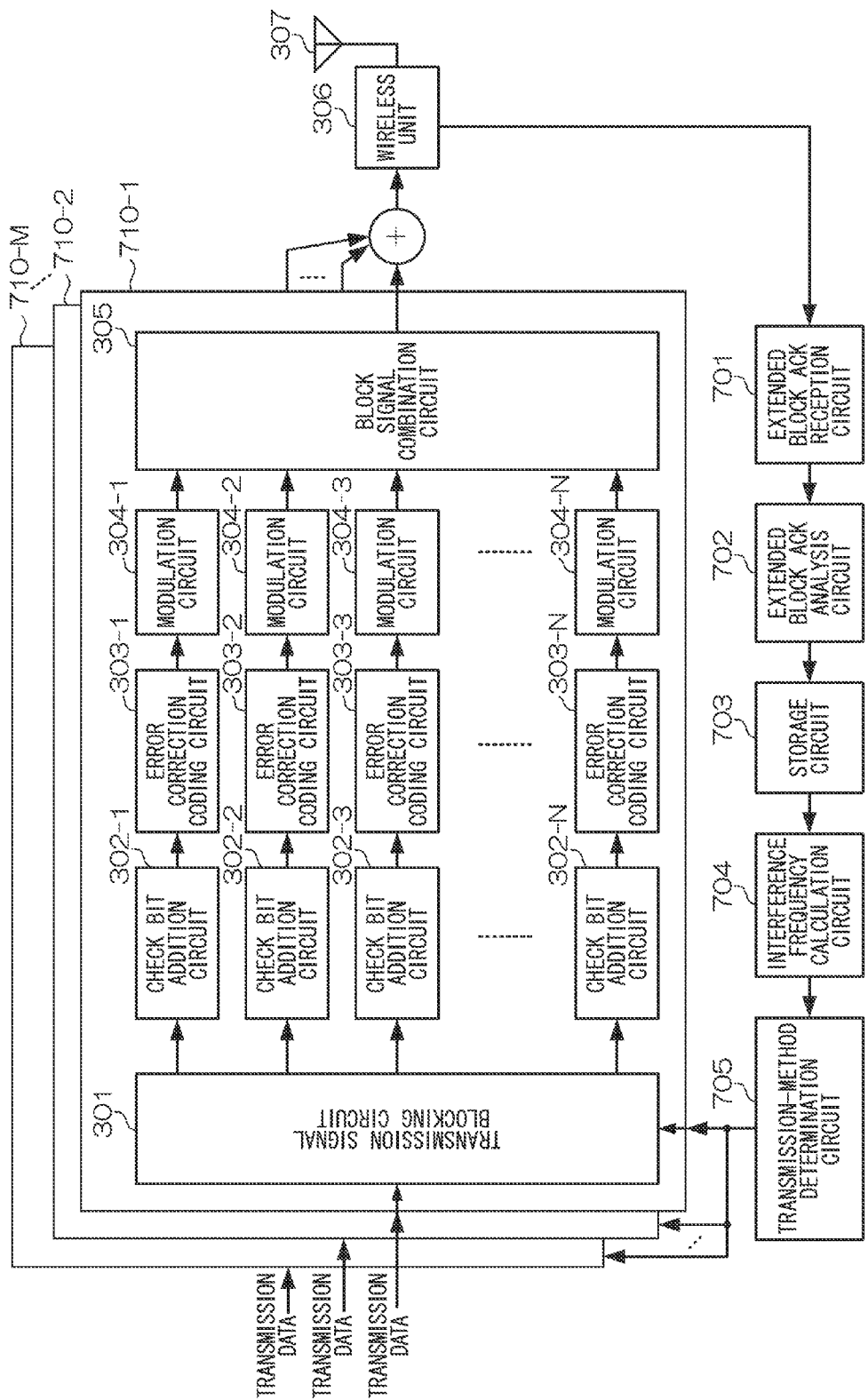
FIG. 26 is a block diagram illustrating a configuration of a wireless apparatus (of a base station) according to a fourteenth embodiment of the present invention.

FIG. 26 is a block diagram illustrating a configuration of a wireless apparatus (of a base station) according to the fourteenth embodiment. In FIG. 26, the wireless apparatus (of the base station) realizes MU-MIMO, and has a configuration in which blocks 710-1 to 710-M each including the transmission signal blocking circuit 301, the check bit addition circuits 302-1 to 302-N, the error correction coding circuits 303-1 to 303-N, the modulation circuits 304-1 to 304-N, and the block signal combination circuit 305 shown in FIG. 22 correspond to terminal stations that are transmission targets (M terminal stations).

An extended block ACK reception circuit 701, an extended block ACK analysis circuit 702, a storage circuit 703, an interference frequency calculation circuit 704, and a transmission-method determination circuit 705 correspond to the extended block ACK reception circuit 501, the extended block ACK analysis circuit 502, the storage circuit 503, the interference frequency calculation circuit 504, and the transmission-method determination circuit 505 shown in FIG. 22, and simultaneously handle extended block ACK signals in the plurality of blocks 710-1 to 710-M, unlike those in FIG. 22.

Further, wireless apparatuses (of the terminal station) according to the fourteenth embodiment are assumed to include M wireless apparatuses (terminal stations) having the same configuration as that in FIG. 20.

Figure 27:
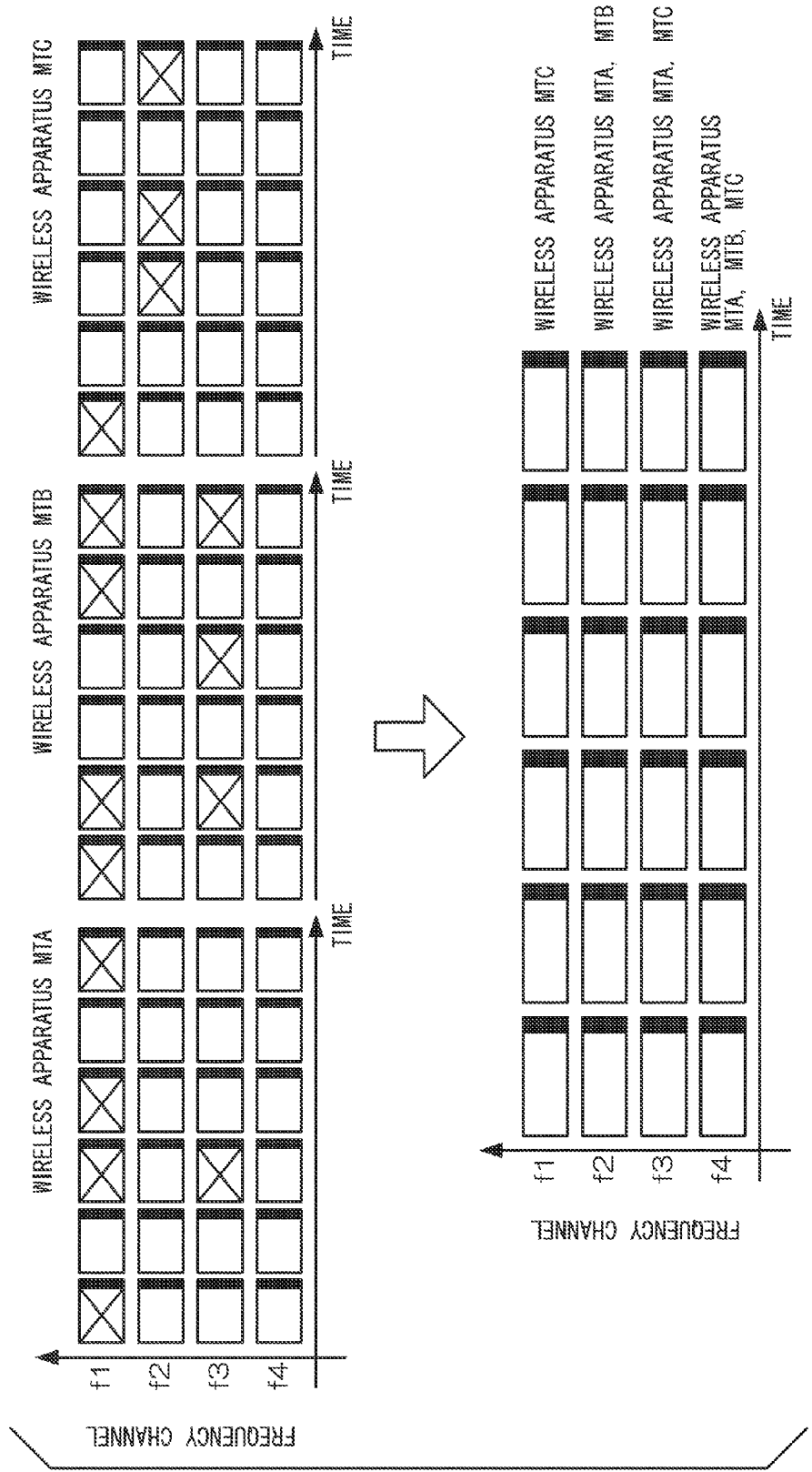
FIG. 27 is a conceptual diagram illustrating a MU-MIMO transmission method using interference information according to the fourteenth embodiment.

FIG. 27 is a conceptual diagram illustrating an MU-MIMO transmission method using interference information according to the fourteenth embodiment. When MU-MIMO transmission is performed, a frequency channel in which MU-MIMO is performed is determined based on an interference frequency of each frequency channel of each wireless apparatus. Specifically, each wireless apparatus is assumed to have acquired interference information, as shown in an upper part of FIG. 18.

That is, in a wireless apparatus MTA, the interference frequency is high in a frequency channel f1, the interference frequency is moderate in a frequency channel f3, and the interference frequency is low in frequency channels f2 and f4. Further, in a wireless apparatus MTB, the interference frequency is high in the frequency channels f1 and f3, and the interference frequency is low in the frequency channels f2 and f4. Similarly, in a wireless apparatus MTC, the interference frequency is moderate in the frequency channel f1, the interference frequency is high in the frequency channel f2, and the interference frequency is low in the frequency channels f3 and f4.

In the fourteenth embodiment, a frequency channel in which MU-MIMO is performed is determined based on an interference frequency of each frequency channel of each wireless apparatus. That is, as shown in a lower part of FIG. 27, SU (Single-User) transmission to the wireless apparatus MTC is performed in a frequency channel f1, MU-MIMO transmission to the wireless apparatuses MTA and MTB is performed in a frequency channel f2, MU-MIMO transmission to the wireless apparatuses MTA and MTC is performed in a frequency channel f3, and a MU-MIMO transmission to the wireless apparatuses MTA, MTB, and MTC is performed in a frequency channel f4. Thus, it is possible to greatly increase the throughput by performing transmission in the same time and frequency.

Figure 28:
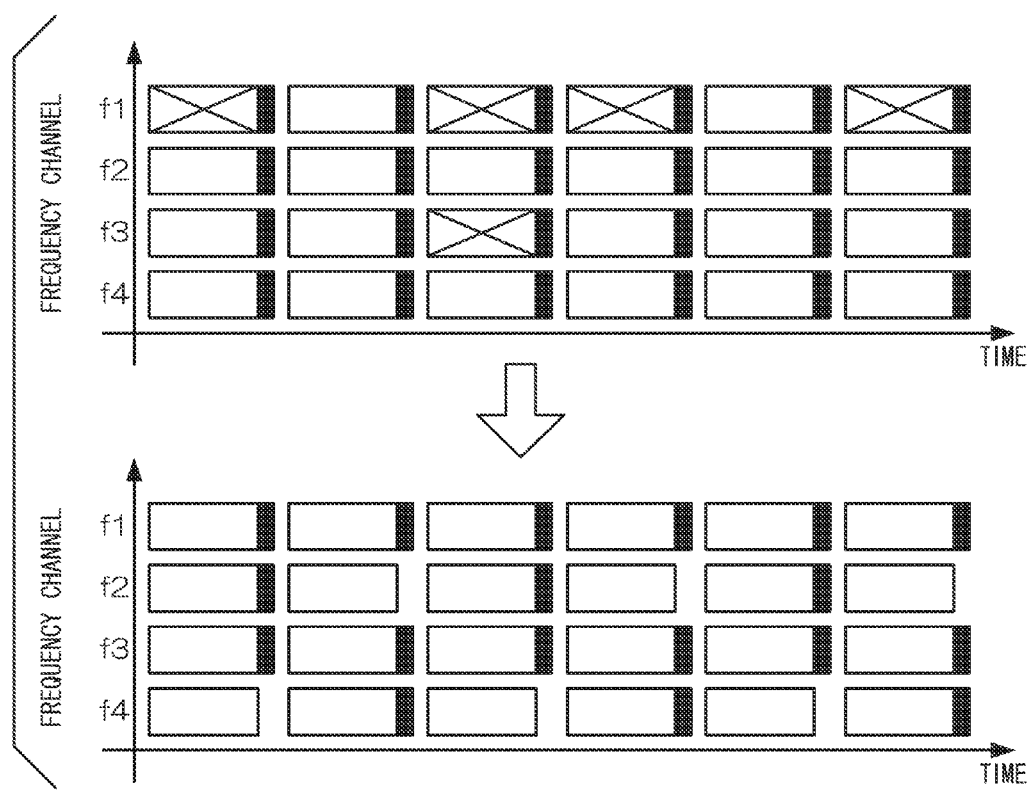
FIG. 28 is a conceptual diagram illustrating improvement of throughput due to error check not being performed in the eleventh to fourteenth embodiments.

Further, while in the eleventh to fourteenth embodiments described above, the check of the presence or the absence of the error in the reception signal using the FCS inserted into each block signal in advance has been described, a frequency channel having fewer errors as shown in FIG. 28 is not subjected to the error check. Thus, it is possible to shorten a processing time.

More specifically, when the interference frequency of the frequency channel in which the data has been received is low in a time (a time zone) at which data has been received from the base station (an access point) based on the history stored in the storage circuit 106 of the wireless apparatus (of the terminal station), interference detection using the check bit is not performed. Accordingly, it is possible to reduce a load of the interference detection and achieve improvement of the throughput in the terminal station.

Since there are many errors in the frequency channels f1 and f3 as shown in an upper part of FIG. 28, the error check of the reception signal is performed using the FCS inserted into each block signal in advance (the FCS is shown in each block), as shown in a lower part of FIG. 28. On the other hand, since there is no error in the frequency channels f2 and f4 as shown in the upper part of FIG. 28, every other error check of the reception signal is omitted (every other FCS is not shown) as shown in a lower part of FIG. 28.

Further, while in the eleventh to fourteenth embodiments described above, the interference frequency is calculated when transmission is performed, and then the transmission is performed as described above, the calculation of the interference frequency may be reduced using interference statistical information. Here, the interference statistical information is information obtained by recording, in each time, the interference frequency calculated every certain time. For example, one day is divided into 24 hours and information is obtained by recording the interference frequency each hour.

In the wireless communication, since a change of a communication amount per hour is expected not to be changed on different days, the interference statistical information from one day is effective. Here, while one day has been shown as being divided into 24 hours, it may be divided at a different time interval.

Use of the interference statistical information enables a calculation amount of the interference frequency to be reduced. For example, interference statistical information for one day is assumed to be used. When the interference frequency in the same time of a previous day is low when transmission is performed, the transmission is performed using a transmission method in which the interference is assumed not to be generated.

Meanwhile, when the interference frequency is high, the transmission is performed using a transmission method in which the interference is assumed to be generated. Thus, the transmission method is determined using the interference statistical information instead of calculating the interference frequency for every transmission, thereby reducing a calculation amount of the interference frequency.

REFERENCE SYMBOLS 101 antenna
102 wireless unit
103 reception signal demodulation circuit
104, and 104-1 to 104-N error correction circuit
105, and 105-1 to 105-N error check circuit
106 storage circuit
107 interference frequency calculation circuit
108 transmission-method determination circuit
110, 120, 130 base station
111 to 113, 121 to 123, 131 terminal station
141 to 143 communication cell
201-1 to 201-N antenna
202-1 to 202-N wireless unit
203 S/P circuit
204 propagation channel estimation circuit
205 interference power calculation circuit
206 interference suppression signal generation circuit
207 transmission weight calculation circuit
208 transmission determination circuit
301 transmission signal blocking circuit
302-1 to 302-N check bit addition circuit
303-1 to 303-N error correction coding circuit
304-1 to 304-N modulation circuit
305 block signal combination circuit
306 wireless unit
307 antenna
401 reception signal division circuit
402 transmission-method determination circuit
501, 701 extended block ACK reception circuit
502, 702 extended block ACK analysis circuit
503, 703 storage circuit
504, 704 interference frequency calculation circuit
505, 705 transmission-method determination circuit
601 extended block ACK generation circuit

The invention claimed is:

1. A wireless communication method in which each communication cell includes a base station and a terminal station, and a base station of a first communication cell performs wireless communication using the same time and frequency channel as a base station or a terminal station of a second communication cell adjacent to the first communication cell, the method comprising:

transmitting, from the base station of the second communication cell, a transmission request signal to request transmission from the base station of the second communication cell;

waiting, by the base station of the first communication cell, for a response signal transmitted from the terminal station of the second communication cell to be received when receiving the transmission request signal;

transmitting, by the terminal station of the second communication cell, a response signal when receiving the transmission request signal;

receiving, by the base station of the first communication cell, the response signal transmitted from the terminal station of the second communication cell, and calculating an interference power between the base station of the first communication cell and the terminal station of the second communication cell from the response signal; and performing, by the base station of the first communication cell, data transmission to the terminal station of the first communication cell based on a transmission power determined from the interference power, further comprising:

when the base station of the first communication cell performs data transmission to the terminal station of the first communication cell using the transmission power determined from the interference power, estimating, by the base station of the first communication cell, a propagation channel between the base station of the first communication cell and the terminal station of the first communication cell to acquire a propagation channel estimation result before a transmission request signal is transmitted from the base station of the second communication cell;

calculating, by the base station of the first communication cell, a transmission rate in the first communication cell based on the propagation channel estimation result in the first communication cell, the propagation channel estimation result in the second communication cell, and the transmission power determined from the interference power; and determining, by the base station of the first communication cell, that the transmission is performed when the calculated transmission rate is equal to or more than a predetermined threshold.

2. The wireless communication method according to claim 1, wherein:

when the base station of the first communication cell determines the transmission power from the calculated interference power, such a transmission power that the interference power given to the terminal station of the second communication cell is equal to or less than a predetermined interference power amount is determined as the transmission power.

3. The wireless communication method according to claim 1, wherein:

when the base station of the first communication cell determines the transmission power from the calculated interference power, such a transmission power that a transmission rate between the base station and the terminal station of the second communication cell is equal to or less than predetermined bits is determined as the transmission power.

4. The wireless communication method according to claim 1, further comprising:

when the base station of the first communication cell performs data transmission to the terminal station of the first communication cell using the transmission power determined from the interference power, estimating, by the base station of the first communication cell, a channel from the response signal transmitted from the terminal station of the second communication cell, and storing a propagation channel estimation result; and controlling, by the base station of the first communication cell, directivity of a radio wave produced from a plurality of antennas using the propagation channel estimation result, to thereby suppress an interference power directed to the terminal station of the second communication cell.

5. The wireless communication method according to claim 4, wherein:

when the base station of the first communication cell suppresses the interference power directed to the terminal station of the second communication cell using the antenna directivity control, the transmission power of the base station of the first communication cell is determined based on an interference power caused by an error of the propagation channel estimation result.

6. The wireless communication method according to claim 4, further comprising:

when the base station of the first communication cell performs data transmission to the terminal station of the first communication cell using the transmission power determined from the interference power, estimating, by the base station of the first communication cell, a propagation channel between the base station of the first communication cell and the terminal station of the first communication cell to acquire a propagation channel estimation result before a transmission request signal is transmitted from the base station of the second communication cell;

calculating, by the base station of the first communication cell, a transmission rate in the first communication cell based on the propagation channel estimation result in the first communication cell, the propagation channel estimation result in the second communication cell, and the transmission power determined from the interference power; and determining, by the base station of the first communication cell, that the transmission is performed when the calculated transmission rate is equal to or more than a predetermined threshold.

7. The wireless communication method according to claim 6, further comprising:

when the base station of the first communication cell performs data transmission to the terminal station of the first communication cell using the transmission power determined from the interference power, determining, by the base station of the first communication cell, the number of transmission streams and the transmission power based on the propagation channel estimation result in the first communication cell and the propagation channel estimation result in the second communication cell.

8. The wireless communication method according to claim 4, further comprising:

when the base station of the first communication cell performs data transmission to the terminal station of the first communication cell using the transmission power determined from the interference power, determining, by the base station of the first communication cell, the number of transmission streams and the transmission power based on the propagation channel estimation result in the first communication cell and the propagation channel estimation result in the second communication cell.

9. The wireless communication method according to claim 1, further comprising:

when the base station of the first communication cell performs data transmission to the terminal station of the first communication cell using the transmission power determined from the interference power, determining, by the base station of the first communication cell, the number of transmission streams and the transmission power based on the propagation channel estimation result in the first communication cell and the propagation channel estimation result in the second communication cell.

10. The wireless communication method according to claim 1, further comprising:
when the base station of the first communication cell performs data transmission to the terminal station of the first communication cell using the transmission power determined from the interference power,
estimating, by the base station of the first communication cell, a communication time of the second communication cell from the transmission request signal transmitted from the base station of the second communication cell; and performing, by the base station of the first communication cell, the transmission to the terminal station of the first communication cell before a communication time of the second communication cell.

11. A base station in a wireless communication system in which each communication cell includes a base station and a terminal station, and a base station or a terminal station of a first communication cell performs wireless communication using the same time and frequency channel as a base station or a terminal station of a second communication cell adjacent to the first communication cell, the base station of the first communication cell comprising:
a plurality of antenna elements;
a reception unit configured to receive a signal using the plurality of antenna elements;
a transmission unit configured to transmit a signal using the plurality of antenna elements;
a propagation channel estimation circuit configured to perform propagation channel estimation from a response signal transmitted from the terminal station of the second communication cell to obtain a propagation channel estimation result, the response signal being received by the reception unit;
an interference power calculation circuit configured to calculate an interference power between the base station and the terminal station of the second communication cell from the propagation channel estimation result obtained by the propagation channel estimation circuit; and
an interference suppression signal generation circuit configured to generate an interference suppression signal using a transmission power determined from the interference power calculated by the interference power calculation circuit when the interference power is equal to or more than a predetermined threshold,
wherein the transmission unit performs data transmission to the terminal station of the first communication cell using the interference suppression signal generated by the interference suppression signal generation circuit, further comprising:
a transmission weight calculation circuit configured to calculate a transmission weight for suppressing an interference power directed to the terminal station of the first communication cell through antenna directivity control using the propagation channel estimation result obtained by the propagation channel estimation circuit,
wherein the interference power calculation circuit calculates an interference power when the transmission weight calculated by the transmission weight calculation circuit is used, and
the interference suppression signal generation circuit generates the interference suppression signal using the transmission weight calculated by the transmission weight calculation circuit and the interference power calculated by the interference power calculation circuit.

12. The base station according to claim 11, further comprising:
a transmission determination circuit configured to estimate a transmission capacity of the first communication cell based on the propagation channel between the base station and the terminal station of the first communication cell estimated by the propagation channel estimation circuit and the interference suppression signal generated by the interference suppression signal generation circuit, and determine that the transmission is performed when the estimated transmission capacity is equal to or more than a predetermined threshold.

* * * * *